(12) United States Patent
Huang et al.

(10) Patent No.: US 10,869,310 B2
(45) Date of Patent: *Dec. 15, 2020

(54) CLASSIFICATION OF BASIC SERVICE SETS BASED ON TRANSMISSION OPPORTUNITY HOLDER ADDRESSES

(71) Applicant: Intel IP Corporation, Santa Clara, CA (US)

(72) Inventors: Po-Kai Huang, San Jose, CA (US); Laurent Cariou, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/228,258

(22) Filed: Dec. 20, 2018

(65) Prior Publication Data

US 2019/0239219 A1 Aug. 1, 2019

Related U.S. Application Data

(63) Continuation of application No. 15/475,245, filed on Mar. 31, 2017, now Pat. No. 10,187,889.

(60) Provisional application No. 62/379,361, filed on Aug. 25, 2016.

(51) Int. Cl.
*H04W 72/04* (2009.01)
*H04W 74/08* (2009.01)
*H04W 84/12* (2009.01)

(52) U.S. Cl.
CPC ... *H04W 72/0446* (2013.01); *H04W 74/0816* (2013.01); *H04W 84/12* (2013.01)

(58) Field of Classification Search
CPC ...... H04W 28/06; H04W 74/04; H04W 76/11
See application file for complete search history.

(56) References Cited

U.S. PATENT DOCUMENTS

| 10,187,889 | B2 | 1/2019 | Huang et al. |
| 2012/0230317 | A1 | 9/2012 | Kim et al. |
| 2012/0327870 | A1 | 12/2012 | Grandhi et al. |
| 2014/0185557 | A1 | 7/2014 | Yang et al. |
| 2016/0050691 | A1 | 2/2016 | Jauh et al. |

(Continued)

OTHER PUBLICATIONS

"U.S. Appl. No. 15/475,245, Examiner Interview Summary dated Aug. 13, 2018", 3 pgs.

(Continued)

*Primary Examiner* — Melanie Jagannathan
(74) *Attorney, Agent, or Firm* — Schwegman Lundberg & Woessner, P.A.

(57) ABSTRACT

Methods, apparatuses, and computer-readable media for classification of basic service sets (BSS) based on transmission opportunity holder addresses are disclosed. An apparatus of a high-efficiency (HE) station is disclosed comprising processing circuitry. The processing circuitry may be configured to if the frame is not classified as an intra basic service set (BSS) or inter BSS, and the frame comprises a transmission holder (TXOP) address: classify the frame as the inter-BSS frame, if the TXOP address matches a first stored TXOP address associated with a basic network allocation vector (NAV) and the first stored TXOP address is classified as an inter-basic service set (BSS) frame, or classify the frame as an intra-BSS frame if the TXOP address matches a second stored TXOP address associated with a non-zero intra-BSS NAV.

20 Claims, 20 Drawing Sheets

(56) References Cited

U.S. PATENT DOCUMENTS

| | | |
|---|---|---|
| 2016/0374087 A1 | 12/2016 | Liu et al. |
| 2017/0006541 A1 | 1/2017 | Huang et al. |
| 2017/0041798 A1 | 2/2017 | Li et al. |
| 2017/0064708 A1 | 3/2017 | Noh et al. |
| 2017/0064713 A1 | 3/2017 | Barriac et al. |
| 2017/0142659 A1 | 5/2017 | Noh et al. |
| 2017/0279568 A1 | 9/2017 | Huang et al. |
| 2017/0295560 A1 | 10/2017 | Kim et al. |
| 2018/0063836 A1 | 3/2018 | Huang et al. |

OTHER PUBLICATIONS

"U.S. Appl. No. 15/475,245, Non Final Office Action dated May 25, 2018", 17 pgs.

"U.S. Appl. No. 15/475,245, Notice of Allowance dated Sep. 13, 2018", 8 pgs.

"U.S. Appl. No. 15/475,245, Response filed Aug. 10, 2018 to Non Final Office Action dated May 25, 2018", 12 pgs.

CLASSIFICATION OF BASIC SERVICE SETS BASED ON TRANSMISSION OPPORTUNITY HOLDER ADDRESSES

PRIORITY CLAIM

This application is a continuation of U.S. patent application Ser. No. 15/475,245, filed Mar. 31, 2017, now issued as U.S. Pat. No. 10,187,889 which claims the benefit of priority under 35 USC 119(e) to U.S. Provisional Patent Application Ser. No. 62/379,361, filed Aug. 25, 2016, each of which is incorporated herein by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for classification of basic service sets (BSSs) based on transmission opportunity (TXOP) holder addresses.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
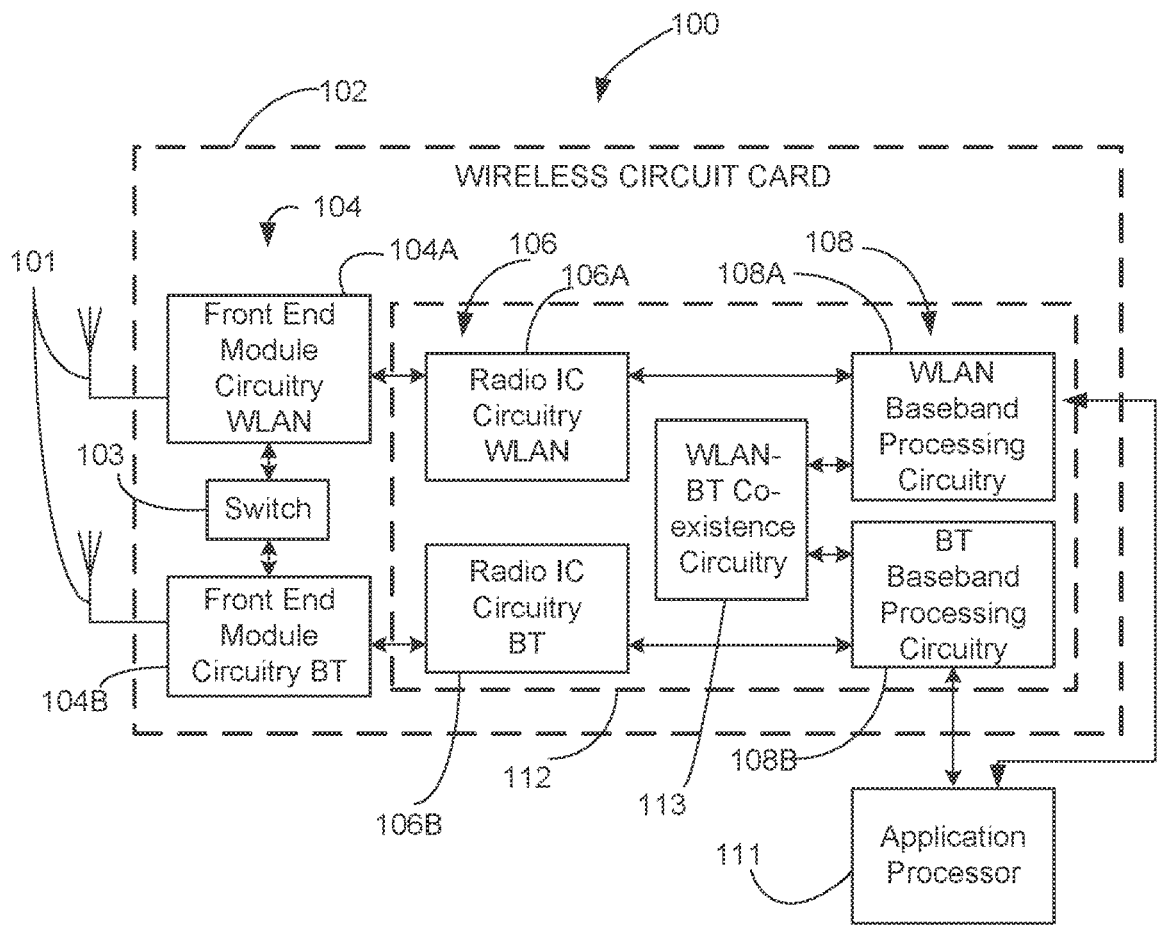
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
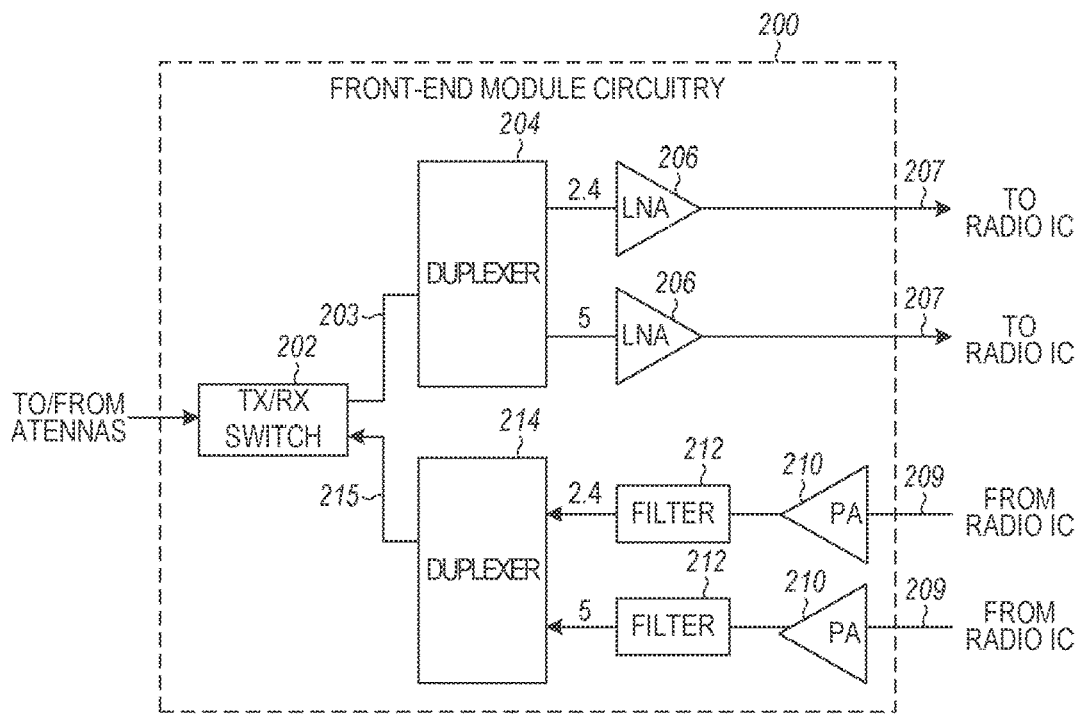
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
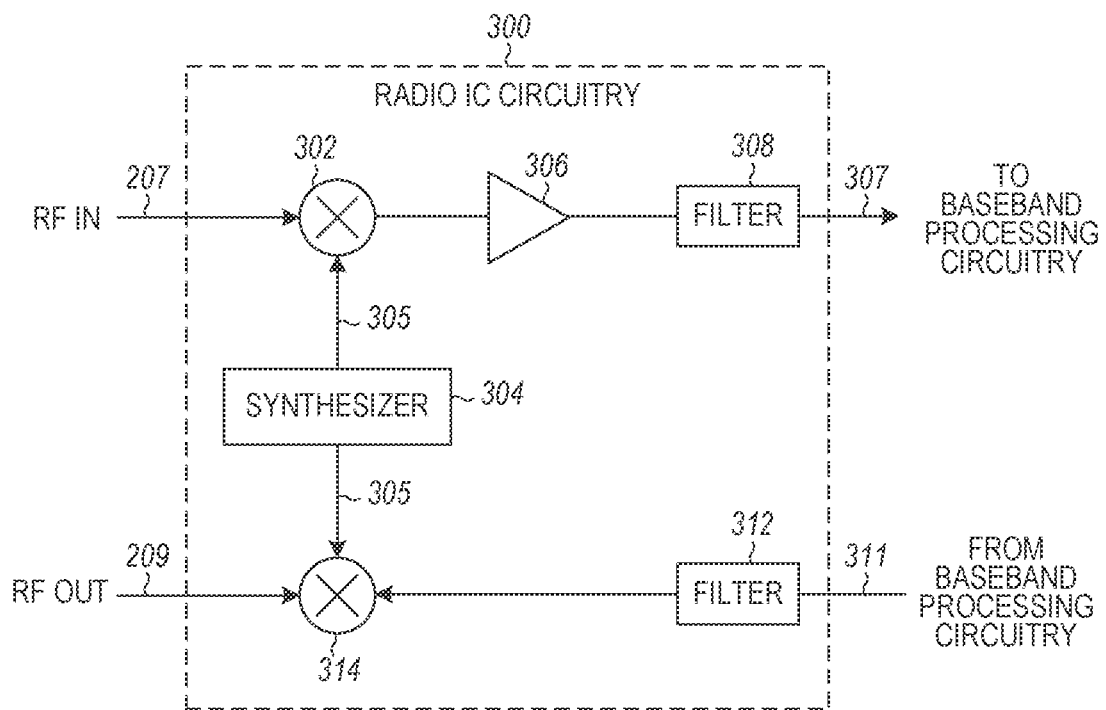
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
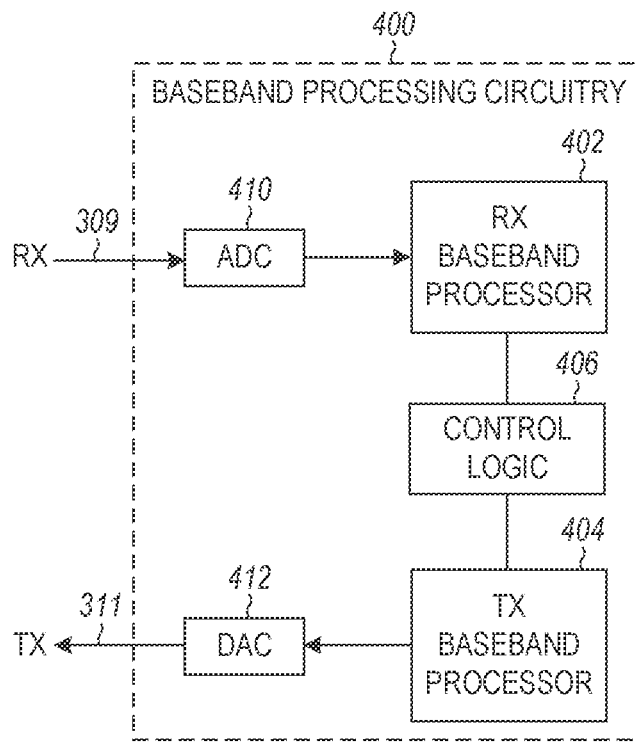
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
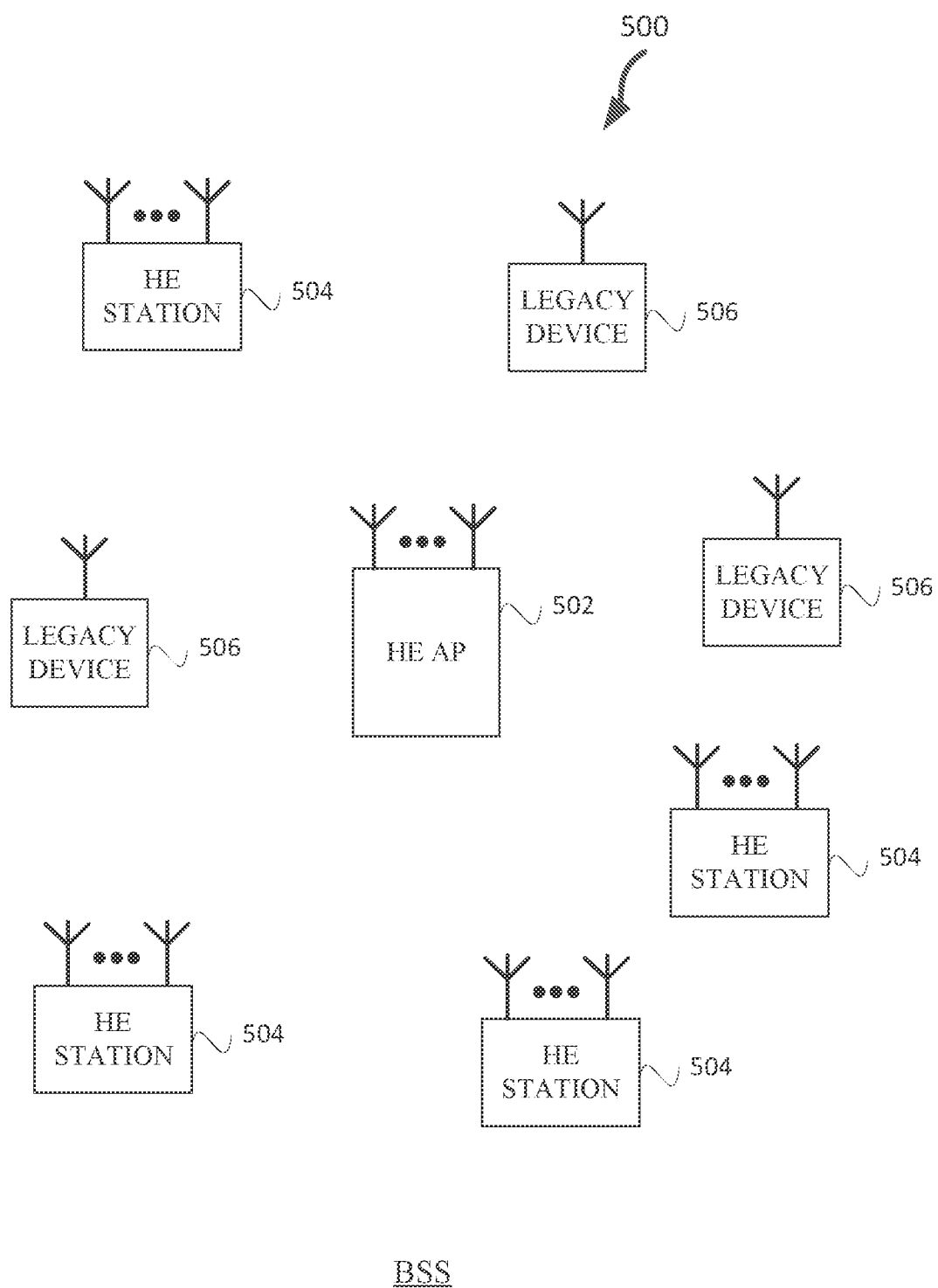
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-26.

In example embodiments, the HE station 504 and/or the HE AP 502 are configured to perform the methods and operations/functions described herein in conjunction with FIGS. 1-26. In example embodiments, an apparatus of the HE station 504 and/or an apparatus of the HE AP 502 are configured to perform the methods and functions described herein in conjunction with FIGS. 1-26. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
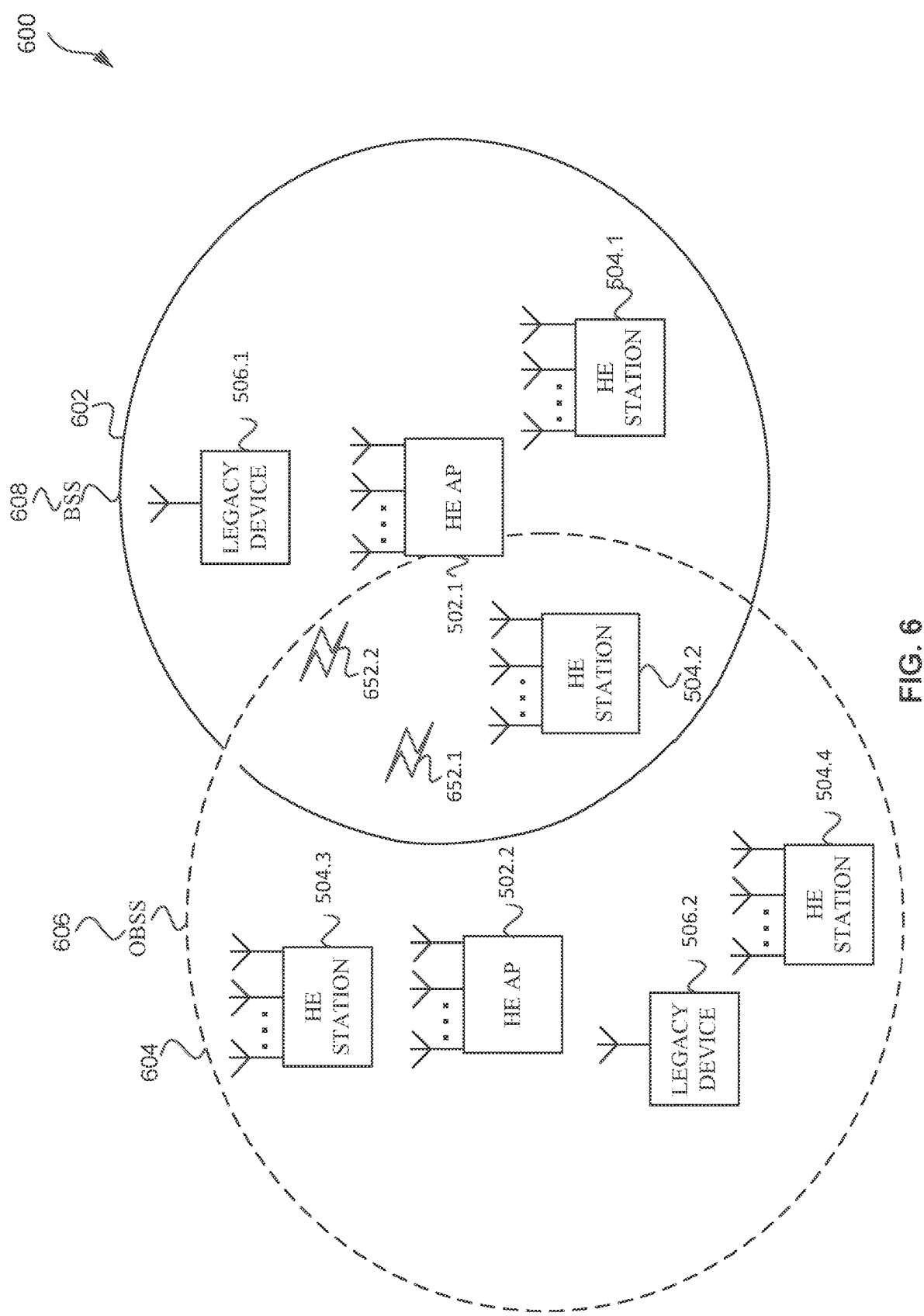
FIG. 6 illustrates an overlapping BSS (OBSS) and BSS in accordance with some embodiments.

FIG. 6 illustrates an overlapping BSS (OBSS) 606 and BSS 608 in accordance with some embodiments. Illustrated in FIG. 6 is HE stations 504, HE APs 502, legacy devices 506, transmit distance 602 of BSS 608, transmit distance 604 of OBSS 606, OBSS 606, BSS 608, and communications 652. Transmit distance 602 and transmit distance 604 may indicate a range beyond which the signals of the HE access point 502.1 and HE access point 502.2, respectively, will be received at below a minimum received power detection (PD). BSS 608 and OBSS 606 may be BSSs 500 as described in conjunction with FIG. 5. HE station 504.1, HE station 504.2, and legacy device 506.1 may be associated with HE access point 502.1. HE station 504.3, HE station 504.4, and legacy device 506.2 may be associated with HE access point 502.2. Communication 652.1 and 652.2 may be from HE AP 502.1, HE AP 502.2, HE station 504.1, HE station 504.2, HE station 504.3, HE station 504.4, legacy device 506.1, and/or legacy device 506.2.

Figure 7:
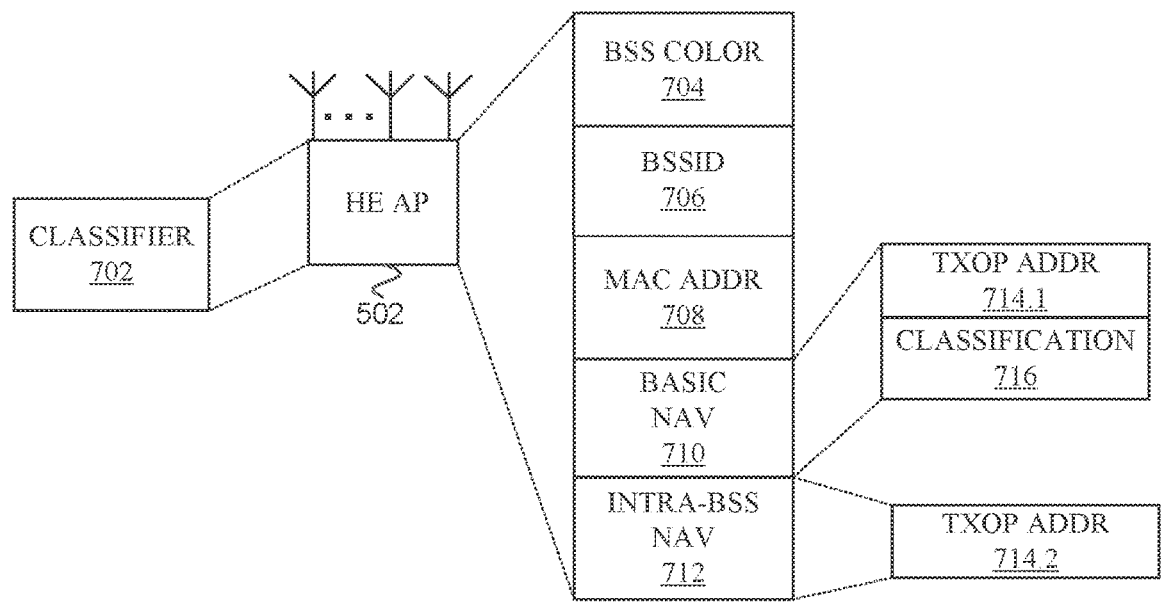
FIG. 7 illustrates a HE AP in accordance with some embodiments.
Figure 8:
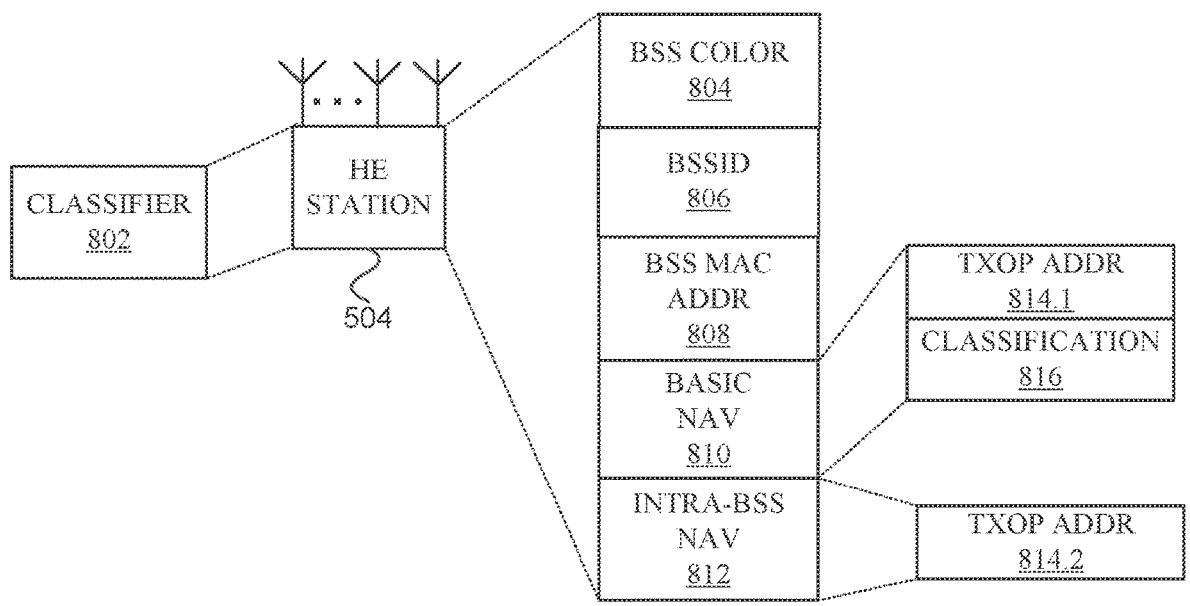
FIG. 8 illustrates a HE station in accordance with some embodiments.

FIGS. 6-8 are disclosed in conjunction with one another. FIG. 7 illustrates an HE AP 502 in accordance with some embodiments. FIG. 8 illustrates a HE station 504 in accordance with some embodiments.

HE AP 502 may include classifier 702, BSS color 704, BSSID 706, media access control (MAC) address (ADDR) 708, basic network allocation vector (NAV) 710, and intra-BSS NAV 712. In some embodiments, HE station 504 includes one or more of classifier 802, BSS color 804, BSSID 806, BSS MAC address 808, basic NAV 810, and intra-BSS NAV 812. Classifier 702, 802 may be the same or similar as a classifier 1502.

The BSS color 704, 804 may be a color (e.g., a number) associated with a BSS 500 (e.g., OBSS 606 and BSS 608). In some embodiments, BSSs 500 have different BSS colors. In some embodiments, a management entity (not illustrated) may manage the BSS colors 704, 804. HE APs 502 and/or HE stations 504 may store BSS color 704, 804, in accordance with some embodiments. The HE APs 502 may announce the BSS color 704 and HE stations 504 may store the BSS color 804 that is announced. For example, a HE station 504 may store the BSS color 704 of the BSS 606, 608 with which the HE station 504 is associated. The HE station 504 may store the BSS color 704 in BSS color 804. The OBSS 606 and BSS 608 may each have a BSSID 706, e.g., the BSSID 706 for OBSS 606 may be a MAC address 708 of the HE AP 502.2, and the BSSID 706 of BSS 608 may be a MAC address 708 of HE AP 602.1. In some embodiments, the BSSIDs 706 may be generated by the HE AP 502 and/or assigned by a management entity of the BSS 606 and/or BSS 608. The BSS color 704 and/or BSSID 706 may be included in communications 652. The BSS color 704, 804 may be an 8-bit field that is included in a HE preamble portion of the communications 652. The BSSID 706, 806 may be a 48-bit ID.

Figure 9:
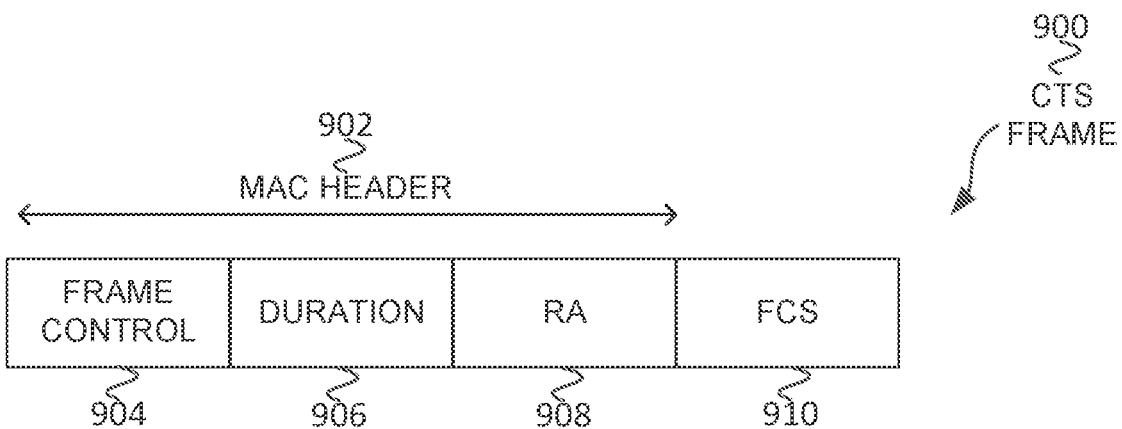
FIG. 9 illustrates a clear-to-send (CTS) frame in accordance with some embodiments.

The HE stations 504 and/or HE APs 502 may maintain one or more NAVs, e.g., basic NAV 710, 810 and intra-BSS NAV 712, 812. In some embodiments, the HE stations 504 and/or HE APs 502 may maintain more than two NAVs. Basic NAV 710, 810 may be termed an inter-BSS NAV in some embodiments. Basic NAV 710, 810 may have a transmission opportunity (TXOP) address 714.1, 814.1 and classification 716, 816 associated with the basic NAV 710, 810. The TXOP address 714.1, 814.1 may be the MAC address of the transmitter of a communication 652 that set the basic NAV 710, 810, in accordance with some embodiments. The TXOP address 714.1, 814.1 may be a TXOP address from a received frame that was classified as an intra-BSS frame, inter-BSS frame, or unclassified frame. In some embodiments, the TXOP address 714.1, 814.1 may be set to an address 2 field (which may be address 2 field in accordance with IEEE 802.11ax) of the communication 652. In some embodiments, TXOP addr 714.1, 814.1 may be set to an address 1 field (which may be address 1 field in accordance with IEEE 802.11ax) when the communication 652 is a CTS frame 900 (FIG. 9). In some embodiments, TXOP address 714.1, 814.1 may be set to an address 1 field (which may be address 1 field in accordance with IEEE 802.11ax) when the communication 652 is a frame that does not include the address 2 field. In some embodiments, the TXOP address 714.1, 814.1 may be set to a BSSID 806 (e.g., address 3 field in accordance with IEEE 802.11ax) of the communication 652.

In some embodiments, the classification 716, 816 may be an indication if the TXOP address 714.1, 814.1 was classified (e.g., by classify 1502) as an inter-BSS communication 652 or classified as not being able to be classified as either an inter-BSS or intra-BSS communication 652. The classification 716, 816 may be the same or similar as classification 1506.

Basic NAV 710, 810 and/or intra-BSS NAV 712, 812 may have one or more of a BSS color (not illustrated), BSSID (not illustrated), transmitter address (TA) field (not illustrated), and/or receive address (RA) field (not illustrated) associated with the Basic NAV 710, 810 and/or intra-BSS NAV 712, 812 that are based on a communication 652 that set the basic NAV 710, 810 and/or intra-BSS NAV 712, 812.

The HE station 504 and/or HE AP 502 may be configured to store information (e.g., BSS color, BSSID, TA, TA, TXOP address 714, 814, and/or classification 716, 816) from a communication 652 when the HE station 504 and/or HE AP 502 sets a basic NAV 710, 810 and/or intra-BSS NAV 712, 812 based on the communication 652 used to set the NAV 710, 810 and/or intra-BSS NAV 712, 812. The HE station 504 and/or HE AP 502 may be configured to store information (e.g., BSS color, BSSID, TA, RA, and/or classification 716, 816), when the HE station 104 and/or HE AP 502 receives a communication 652. The information may be used to assist in determining whether subsequent communications 652 are inter-BSS frames or intra-BSS frames, and/or used to determine whether a previously received communications 652 is an inter-BSS or intra-BSS frame based on subsequent communications 652. The information may be used to classify communications 652. The BSS MAC addr 808 may be a MAC address associated with the BSS 606, 608 that the HE station 504 is associated with. The BSS MAC addr 808 may be a MAC addr of the HE AP 502 of the BSS 608, 608.

The communications 652 may each be a PPDU, e.g., HE extended range (ER) single user (SU) PPDU, HE SU PPDU, HE trigger-based PPDU, or HE MU PPDU. The communications 652 may be a CTS frame 900 (FIG. 9) frame, ACK frame 1000 (FIG. 10) frame, CF-End 1100 frame (FIG. 11) frame, RTS frame 1200 (FIG. 12) frame, data frame 1300 (FIG. 13) frame, or MU-RTS 1400 (FIG. 14) frame.

The HE stations 504 and/or HE APs 502 may determine whether or not a communication 652 needs to be considered based on a received energy level or a received physical (PHY) header of a frame (e.g., communication 652).

In some embodiments, there may be more than one HE AP 502 associated with a BSS color 704 and/or BSSID 706, and the more than one HE APs 502 may be communicatively coupled through a management entity (not illustrated), e.g., a management entity that is part of a router and/or a management entity that is part of backend server that is connected to the BSS 606, 608.

FIG. 9 illustrates a clear-to-send (CTS) frame 900 in accordance with some embodiments. The CTS frame 900 may include a MAC header 902 and a frame control sequence (FCS) 910 field. The MAC header 902 may include a frame control 904, a duration 906, and a RA 908. The frame control 904 may include information about the CTS frame 900 such as the type of the frame. The duration 906 may be a remaining duration of a transmission opportunity. The RA 908 field may be an intended receiver address.

The FCS 910 may include information for detecting and correcting errors in the CTS frame 900. The CTS frame 900 includes a PHY header (not illustrated). The HE AP 502 and/or HE station 504 may be configured to encode and decode the CTS frame 900.

Figure 10:
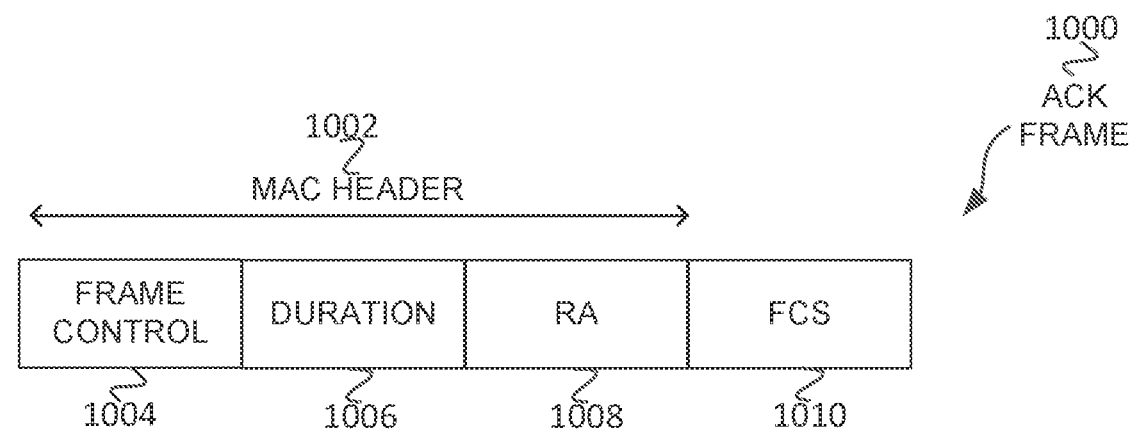
FIG. 10 illustrates an acknowledgement (Ack) frame in accordance with some embodiments.

FIG. 10 illustrates an acknowledgement (Ack) frame 1000 in accordance with some embodiments. The Ack frame 1000 may include a MAC header 1002 and a FCS 1010 field. The MAC header 1002 may include a frame control 1004, a duration 1006, and a RA 1008. The frame control 1004 may include information about the Ack frame 1000 such as the type of the frame. The duration 1006 may be a remaining duration of a transmission opportunity. The RA 1008 field may have an intended receiver address.

The FCS 1010 may include information for detecting and correcting errors in the ACK frame 1000. The Ack frame 1000 includes a PHY header (not illustrated). The HE AP 502 and/or HE station 504 may be configured to encode and decode the Ack frame 1000.

Figure 11:
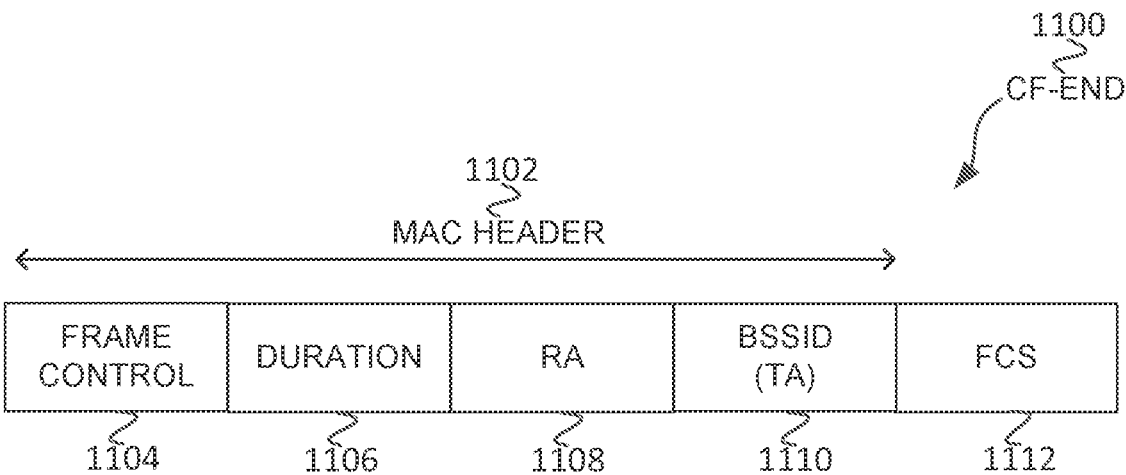
FIG. 11 illustrates a contention-free (CF) end (CF-end) frame in accordance with some embodiments.

FIG. 11 illustrates a contention-free (CF) end (CF-end) frame 1100 in accordance with some embodiments. The CF-end frame 1100 may include a MAC header 1102 and a FCS 1112 field. The MAC header 1102 may include a frame control 1104, a duration 1106, a RA 1108, and a BSSID (TA) 1110. The frame control 1104 may include information about the CF-End 1100 such as the type of the frame. The duration 1106 may be set to 0 to indicate that a contention free period or transmission opportunity is over. The RA 1108 field may have an intended receiver address, which may be a group address. The BSSID (TA) 1110 field may be an address of an intended receiver. The BSSID (TA) 1110 may include an individual/group bit.

The FCS 1112 may include information for detecting and correcting errors in the CF-End frame 1100. The CF-end frame 1100 includes a PHY header (not illustrated). The HE AP 502 and/or HE station 504 may be configured to encode and decode the CF-End frame 1100.

Figure 12:
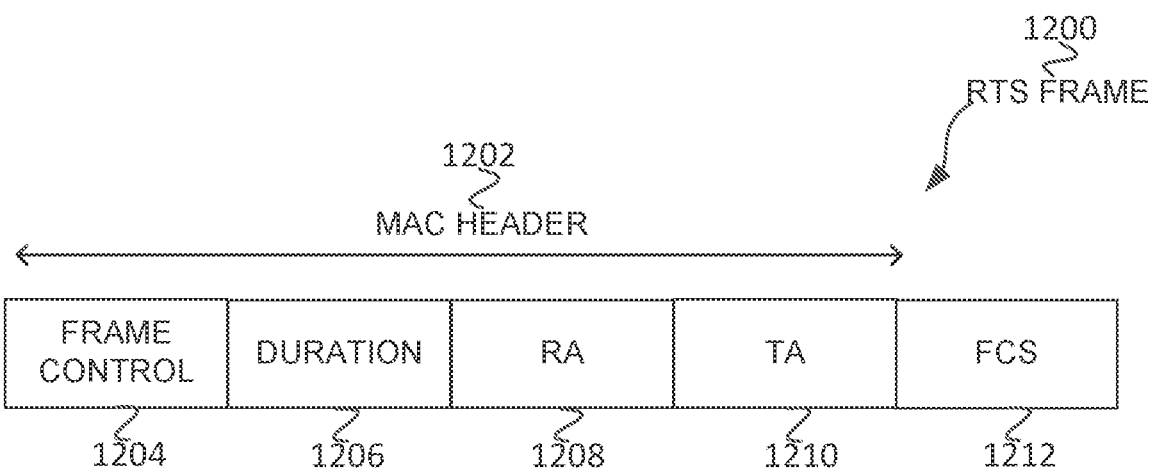
FIG. 12 illustrates a request-to-send (RTS) frame in accordance with some embodiments.

FIG. 12 illustrates a request-to-send (RTS) frame 1200 in accordance with some embodiments. The RTS-end frame 1200 may include a MAC header 1202 and a FCS 1212 field. The MAC header 1202 may include a frame control 1204, a duration 1206, a RA 1208, and a TA 1210. The frame control 1204 may include information about the RTS frame 1200 such as the type of the frame. The duration 1206 may be a remaining duration of a transmission opportunity. The RA 1208 field may have an intended receiver address, which may be a group address. The TA 1210 field may have a transmitter address of the RTS frame 1200. In some embodiments, the TA 1210 may include a signaling bit that is not part of the MAC address of the transmitting station/access point, e.g., group/multicast bit. In some embodiments, when the group/multicast bit is set the TA may be termed a bandwidth signaling TA.

The FCS 1212 may include information for detecting and correcting errors in the RTS frame 1200. The RTS frame 1200 includes a PHY header (not illustrated). The HE AP 502 and/or the HE station 504 may be configured to encode and decode one or more of the frames disclosed herein (e.g., the CF-End frame 1200.)

Figure 13:
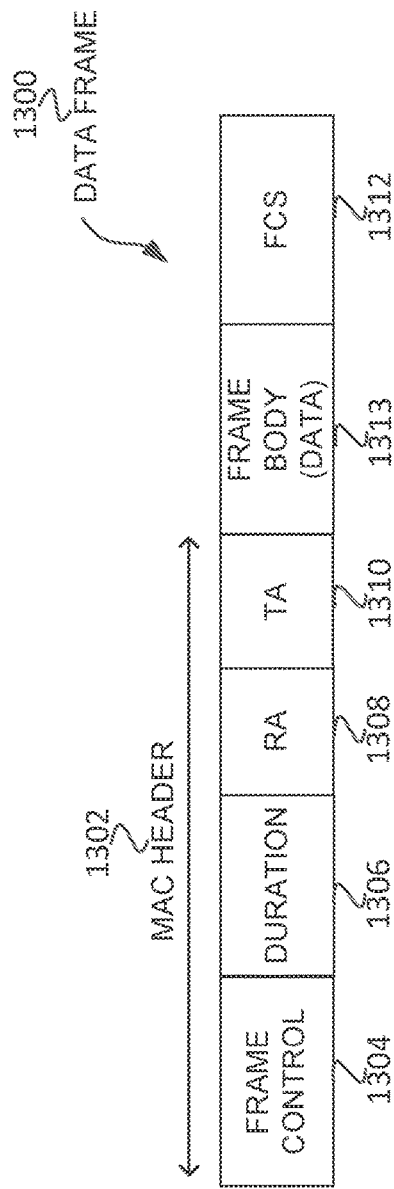
FIG. 13 illustrates a data frame in accordance with some embodiments.

FIG. 13 illustrates a data frame 1300 in accordance with some embodiments. The data frame 1300 may include a MAC header 1302, frame body (data) 1313, and a FCS 1312 field. The MAC header 1302 may include a frame control 1304, a duration 1306, a RA 1308, and a TA 1310. The frame control 1304 may include information about the data frame 1300 such as the type of the frame. The duration 1306 may be a remaining duration of a transmission opportunity. The RA 1308 field may be an intended receiver address, which may be a group address. The TA 1310 field may be a transmitter address of the data frame 1300. The frame body (data) 1313 may include data. The frame body (data) 1313 may be termed the payload of the data frame 1300.

The FCS 1312 may include information for detecting and correcting errors in the data frame 1300. The data frame 1300 includes a PHY header (not illustrated). The HE AP 502 and/or the HE station 504 may be configured to encode and decode one or more of the frames disclosed herein (e.g., the data frame 1300.)

Figure 14:
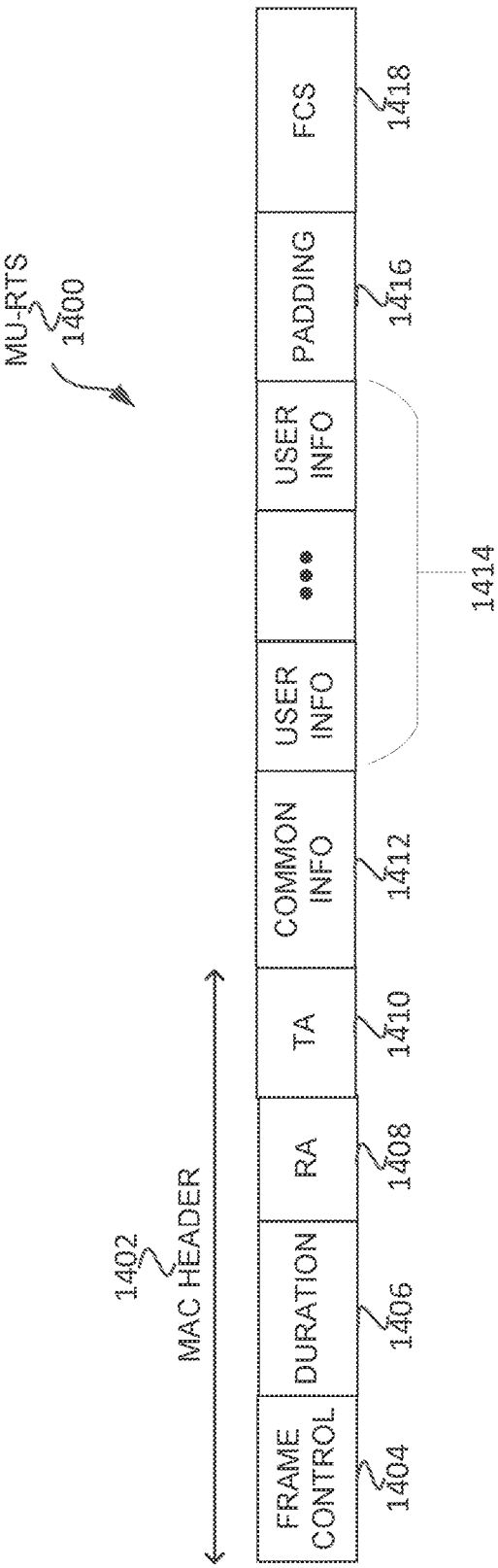
FIG. 14 illustrates a multi-user (MU) RTS frame in accordance with some embodiments.

FIG. 14 illustrates a multi-user (MU) RTS frame 1400 in accordance with some embodiments. The MU-RTS frame 1400 may include a MAC header 1402, common information 1412, user information 1414, padding 1416, and a FCS 1418 field. The MAC header 1402 may include a frame control 1404, a duration 1406, a RA 1408, and a TA 1410.

The frame control 1404 may include information about the MU-RTS 1400 frame 1400 such as the type of the frame. The duration 1406 may be a remaining duration of a transmission opportunity. The RA 1408 field may have an intended receiver address, which may be a group address. The TA 1410 field may have a transmitter address of the MU-RTS frame 1400. The common information 1412 may include information for one or more HE stations 104 to transmit CTSs 900. The user information 1414 may include per user (HE station 504) for transmitting CTSs 900. The padding 1416 may include bits for padding to make the MU-RTS 1400 or portions of MU-RTS 1400 equal to a symbol block size.

The FCS 1418 may include information for detecting and correcting errors in the MU-RTS frame 1400. The MU-RTS frame 1400 includes a PHY header (not illustrated). The HE AP 502 and/or HE station 504 may be configured to encode and decode one or more of the frames disclosed herein (e.g., the MU-RTS frame 1400.)

Figure 15:
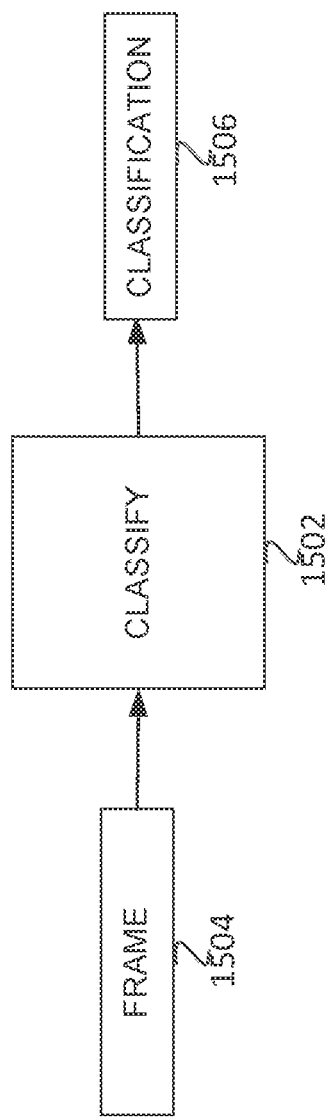
FIG. 15 illustrates classify in accordance with some embodiments.

FIG. 15 illustrates classify 1502 in accordance with some embodiments. In some embodiments, classify 1502 takes a frame 1504 and determines a classification 1506 for the frame 1504. In some embodiments, the classification 1506 may be inter-BSS, intra-BSS, not inter-BSS or intra-BSS (e.g., classify 1502 cannot classify the frame), or part of a same extended service set.

In some embodiments, when an HE station 504 receives a communication 652, if one address in the communication 652 matches a BSSID 706,806 of the HE AP 502, the HE station 504 is associated with, then the HE station 504 classifies the communication 652 as an intra-BSS frame. When none of the addresses of the communication 652 match the BSSID 706 of the HE AP 502, the HE station 504 may use one or more of the methods disclosed herein to determine if the frame is an inter or intra BSS frame.

HE AP 502 and/or HE stations 504 may determine whether communications 652 is from an HE AP 502 or HE station 504 that is part of an OBSS (e.g., 606), or from a RE AP 502 or HE station 504 that is part of a BSS (e.g., 608) based on a preamble and/or MAC portion of the communication 652, e.g., based on a BSSID, MAC address, BSS color, and/or based on previous communications 652 as disclosed herein.

For example, HE station 504.2 may determine that a communication 652.1 is from BSS 608 because the value of the BSS color field (e.g., in a preamble of the data frame 1300 or MU-RTS 1400) is equal to the value of the BSS color 704 field of the BSS 608 that HE station 504.2 is associated with. As another example, HE station 504.2 may determine that a communication 652.1 is from an OBSS (e.g., OBSS 606) because the value of the BSS color field of a preamble of the communication 652.1 is not equal to the value of the BSS color 704 field of the BSS 608 of the HE station 504.2. The operations and functionality of classify 1502 (classifier 702, 802) may be implemented by a HE station 504 and/or HE AP 502.

Figure 16:
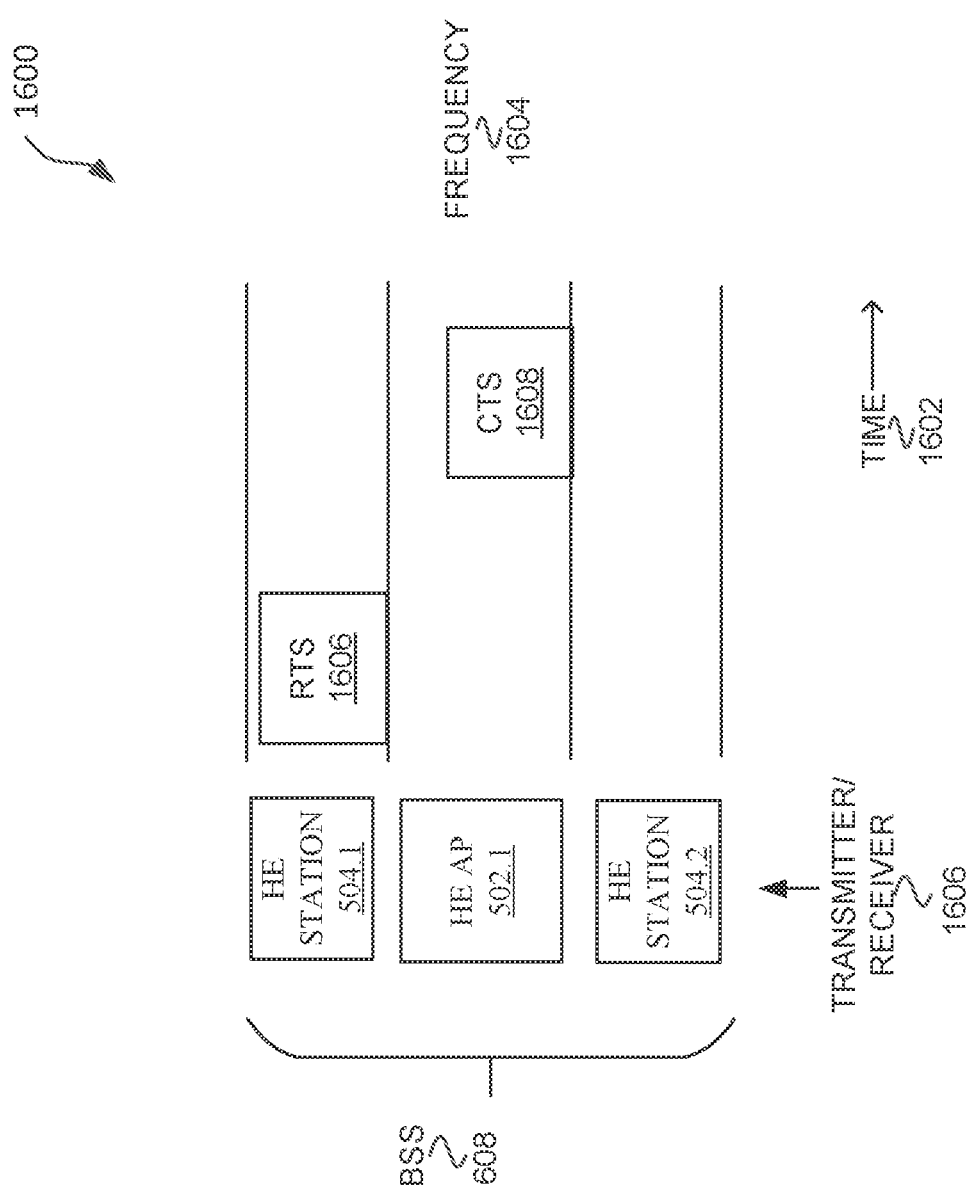
FIG. 16 illustrates a method for classification of BSSs based on transmission opportunity (TXOP) holder address in accordance with some embodiments.

FIG. 16 illustrates a method 1600 for classification of BSSs based on transmission opportunity (TXOP) holder address in accordance with some embodiments. Illustrated in FIG. 16 is time 1602 along a horizontal axis, frequency 1604 along a vertical axis, transmitter/receiver 1606 along a vertical axis, and BSS 608 along a vertical axis. HE station 504.1, HE station 504.2, and HE AP 502.1 are part of BSS 608 (FIG. 6).

The method 1600 begins with a HE station 504.1 transmitting a RTS 1606 frame (e.g., RTS 1200 frame) to HE AP 502.1. HE station 504.2 decodes the RTS 1606. Referring to FIG. 12, the RA 1208 of the RTS 1606 frame may be HE AP 502.1 and the TA 1210 may be HE station 504.1. The duration 1206 may be a duration remaining in a TXOP. HE station 504.2 may classify 802 RTS 1606 as an intra-BSS frame, e.g., based on the RA 1208 matching a BSSID 806 (FIG. 8) of the HE station 504.2. HE station 504.2 may record the TXOP address 814.2 (e.g., TA 1210 of the RTS 1606 frame, which would be MAC address of HE station 504.1.) HE station 504.2 may set intra-BSS NAV 812 to the duration 1206, if the duration 1206 is greater than a current duration of the intra-BSS NAV 812.

The method 1600 continues with the HE AP 502.1 transmitting a CTS 1608. HE station 504.2 decodes the CTS 1608. HE station 504.2 compares the TXOP holder address of the CTS 1608 (e.g., RA 908) with the stored TXOP address 814.2 associated with the intra-BSS NAV 812. The TXOP address 814.2 was stored as the MAC address of HE station 504.1, which is compared with the RA 908 of the CTS 1608, which is the MAC address of HE station 504.1. Since, there is a match TXOP address 814.2 is associated with the intra-BSS NAV 812, the HE station 504.2 classifies (e.g., using classifier 802) CTS 1608 as an intra-BSS CTS 1608.

Figure 17:
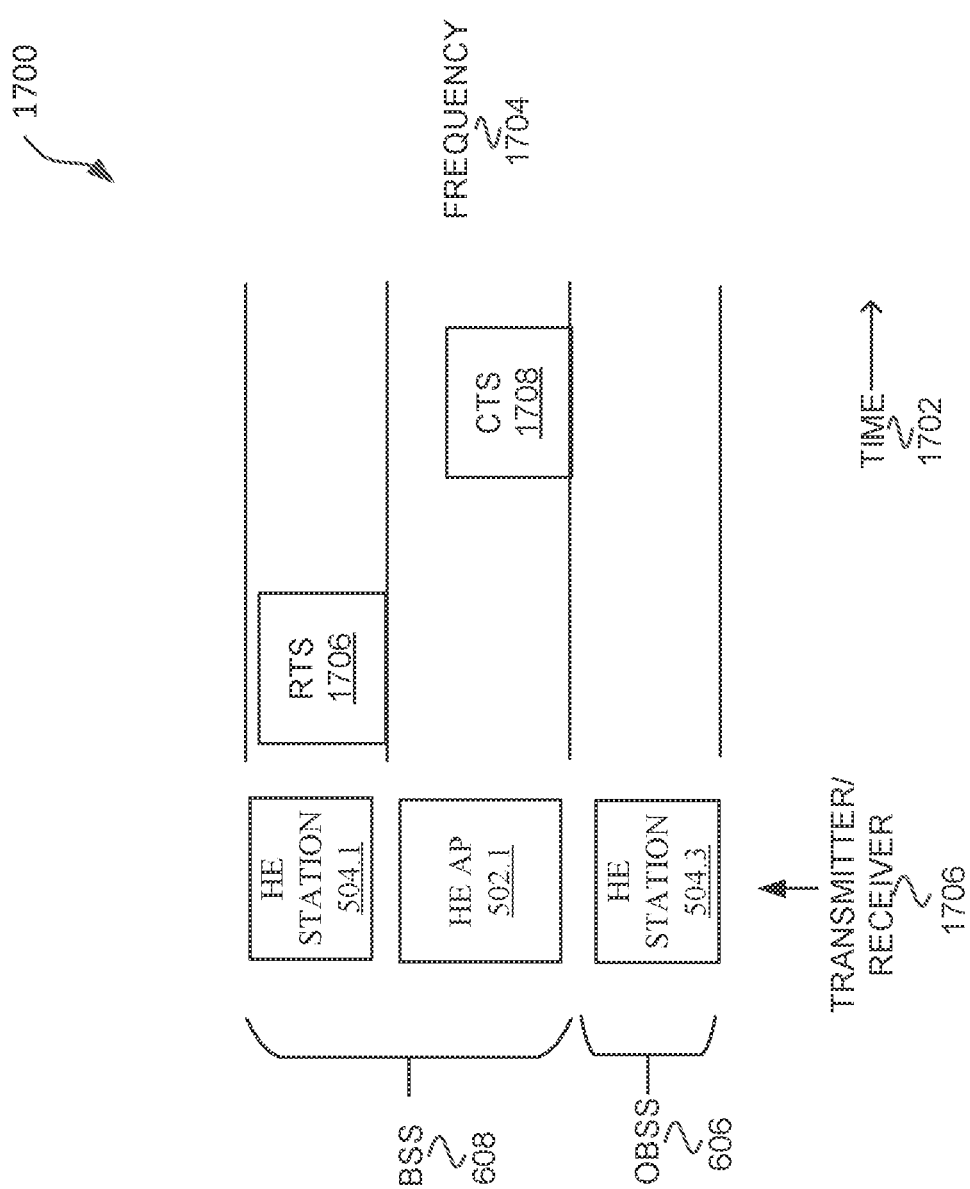
FIG. 17 illustrates a method for classification of BSSs based on TXOP holder address in accordance with some embodiments.

FIG. 17 illustrates a method 1700 for classification of BSSs based on TXOP holder address in accordance with some embodiments. Illustrated in FIG. 17 is time 1702 along a horizontal axis, frequency 1704 along a vertical axis, transmitter/receiver 1706 along a vertical axis, and BSSs 606, 608 along a vertical axis. HE station 504.1 and HE AP 502.1 are part of BSS 608 (FIG. 6); and, HE station 504.3 is part of OBSS 606.

The method 1700 begins with a HE station 504.1 transmitting a RTS 1706 frame (e.g., RTS 1200 frame) to HE AP 502.1. HE station 504.3 decodes the RTS 1606. Referring to FIG. 12, the RA 1208 of the RTS 1606 may be HE AP 502.1 and the TA 1210 may be HE station 504.1. The duration 1206 may be a duration remaining in a TXOP. HE station 502.3 may classify (e.g., using classifier 802) RTS 1706 as an inter-BSS frame or an unclassified frame, e.g., based on neither the RA 1208 or the TA 1210 matching a BSSID 806 (FIG. 8) of the HE station 502.3. HE station 502.3 may record the TXOP address 814.1 (e.g., TA 1210 of the RTS 1706 frame, which would be MAC address of HE station 504.1.) HE station 502.3 may set basic NAV 810 to the duration 1206, if the duration 1206 is greater than a current duration of the basic NAV 810. HE station 502.3 may set classification 816 to inter-BSS (or unclassified) to indicate that the TXOP address 814.1 is classified as an inter-BSS. In some embodiments, the classification 816 may include unclassified and inter-BSS.

The method 1700 continues with the HE AP 502.1 transmitting a CTS 1708. HE station 504.3 decodes the CTS 1708. HE station 504.3 compares the TXOP holder address of the CTS 1708 (e.g., RA 908) with the stored TXOP address 814.1 associated with the basic NAV 810. The TXOP address 814.1 was stored as the MAC address of HE station 504.1, which is compared with the RA 908 of the CTS 1708, which is the MAC address of HE station 504.1. Since, there is a match with TXOP address 814.1, which is associated with the basic NAV 810 and the classification 816 indicates inter-BSS, the HE station 504.3 classifies (e.g., using classifier 802) CTS 1708 as an inter-BSS CTS 1708.

Figure 18:
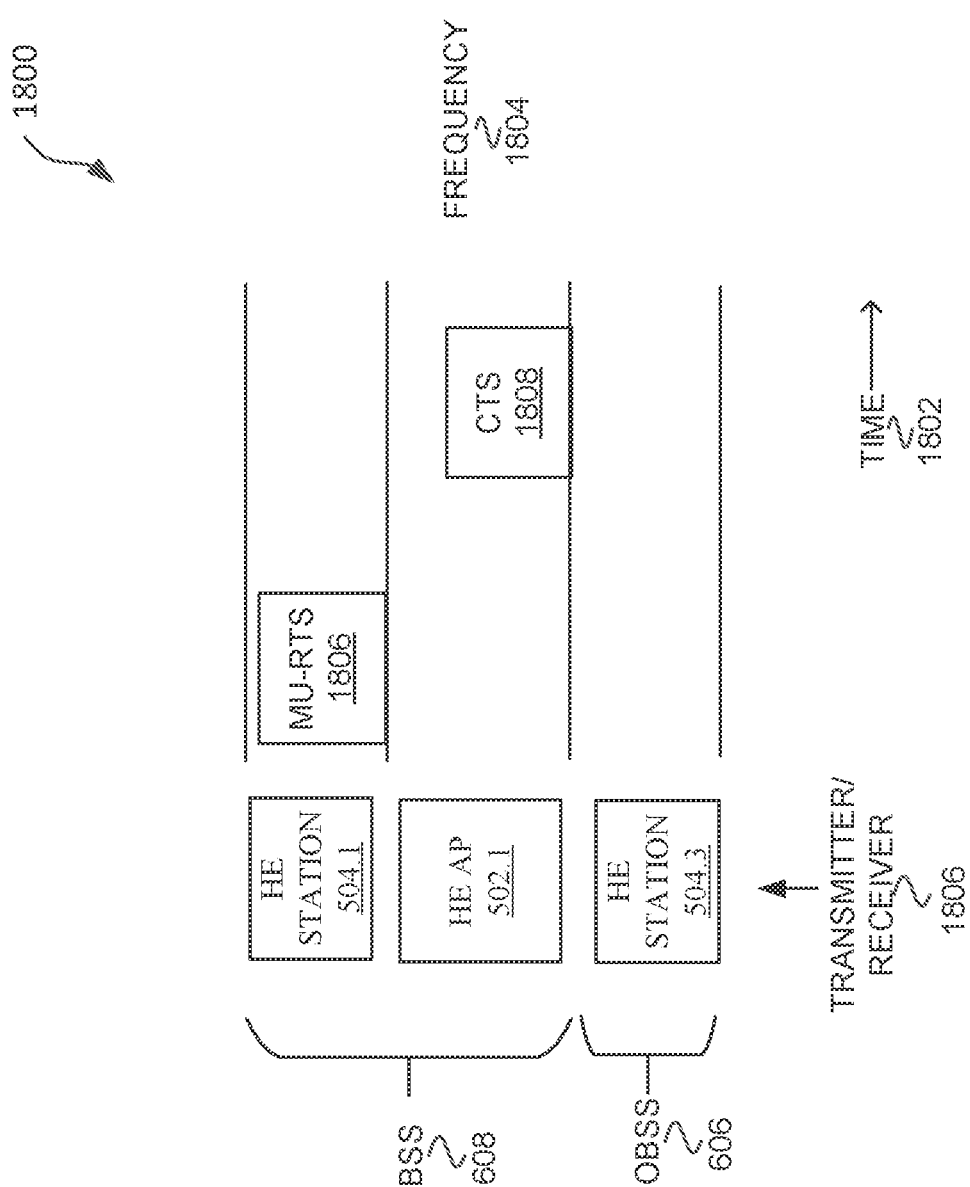
FIG. 18 illustrates a method for classification of BSSs based on TXOP holder address in accordance with some embodiments.

FIG. 18 illustrates a method 1800 for classification of BSSs based on TXOP holder address in accordance with some embodiments. Illustrated in FIG. 18 is time 1802 along a horizontal axis, frequency 1804 along a vertical axis, transmitter/receiver 1806 along a vertical axis, BSS 606, and OBSS 608 along a vertical axis. HE station 504.1 and HE AP 502.1 are part of BSS 608 (FIG. 6); and, HE station 504.3 is part of OBSS 606.

The method 1800 begins with a HE station 504.1 transmitting a MU-RTS 1806 frame (e.g., MU-RTS 1400 frame) to HE AP 502.1. HE station 504.3 decodes the MU-RTS 1806. Referring to FIG. 14, the RA 1408 of the MU-RTS 1806 may be HE AP 502.1 and the TA 1410 may be HE station 504.1. The duration 1406 may be a duration remaining in a TXOP. HE station 502.3 may classify (e.g., using classifier 802) MU-RTS 1806 as an inter-BSS frame, e.g., based on neither the RA 1408 or the TA 1410 matching a BSSID 806 (FIG. 8) of the HE station 502.3. HE station 502.3 may record the TXOP address 814.1 (e.g., TA 1410 of the MU-RTS 1806 frame, which would be the MAC address of HE station 504.1.) HE station 502.2 may set basic NAV 810 to the duration 1406, if the duration 1406 is greater than a current duration of the basic NAV 810. HE station 502.3 may set classification 816 to inter-BSS to indicate that the TXOP address 814.1 (or the frame MU-RTS 1806 associated with the TXOP address 814.1) is classified as an inter-BSS.

The method 1800 continues with the HE AP 502.1 transmitting a CTS 1808. HE station 504.3 decodes the CTS 1808. HE station 504.3 compares the TXOP holder address of the CTS 1808 (e.g., RA 908) with the stored TXOP address 814.1 associated with the basic NAV 810. The TXOP address 814.1 was stored as the MAC address of HE station 504.1, which is compared with the RA 908 of the CTS 1808, which is the MAC address of HE station 504.1. Since, there is a match with TXOP address 814.1, which is associated with the basic NAV 810 and the classification 816 indicates inter-BSS, the HE station 504.3 classifies (e.g., using classifier 802) CTS 1808 as an inter-BSS CTS 1808.

Figure 19:
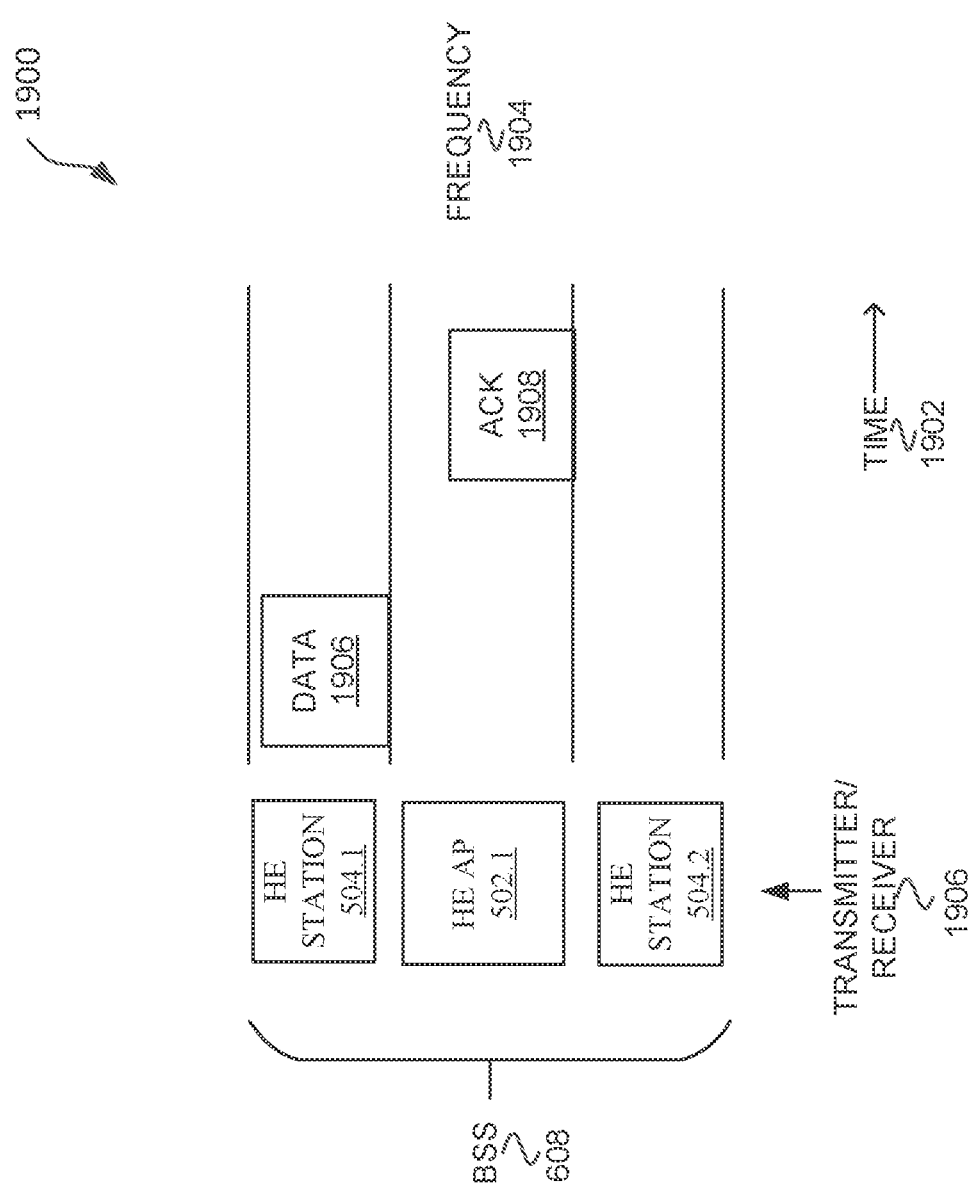
FIG. 19 illustrates a method for classification of BSSs based on TXOP holder address in accordance with some embodiments.

FIG. 19 illustrates a method 1900 for classification of BSSs based on TXOP holder address in accordance with some embodiments. Illustrated in FIG. 19 is time 1902 along a horizontal axis, frequency 1904 along a vertical axis, transmitter/receiver 1906 along a vertical axis, BSS 606, and OBSS 608 along a vertical axis. HE station 504.1, HE station 504.2, and HE AP 502.1 are part of BSS 608 (FIG. 6).

The method 1900 begins with a HE station 504.1 transmitting a data 1906 frame (e.g., data 1300 frame) to HE AP 502.1. HE station 504.2 decodes the data 1906 frame. Referring to FIG. 13, the RA 1308 of the data 1906 frame may be HE AP 502.1 and the TA 1310 may be HE station 504.1. The duration 1306 may be a duration remaining in a TXOP. HE station 502.2 may classify 802 data 1906 frame as an intra-BSS frame, e.g., based on the RA 1308 matching a BSSID 806 (FIG. 8) of the HE station 502.2. HE station 502.2 may record the TXOP address 814.2 (e.g., TA 1210 of the data 1906 frame, which would be MAC address of HE station 504.1.) HE station 502.2 may set intra-BSS NAV 812 to the duration 1306, if the duration 1306 is greater than a current duration of the intra-BSS NAV 812.

The method 1900 continues with the HE AP 502.1 transmitting an ACK 1908. HE station 504.2 decodes the ACK 1908. HE station 504.2 compares the TXOP holder address of the ACK 1908 (e.g., RA 1008) with the stored TXOP address 814.2 associated with the intra-BSS NAV 812. The TXOP address 814.2 was stored as the MAC address of HE station 504.1, which is compared with the RA 1008 of the ACK 1908, which is the MAC address of HE station 504.1. Since, there is a match and TXOP address 814.2 is associated with the intra-BSS NAV 812, the HE station 504.2 classifies (e.g., using classifier 802) ACK 1908 as an intra-BSS ACK 1908.

Figure 20:
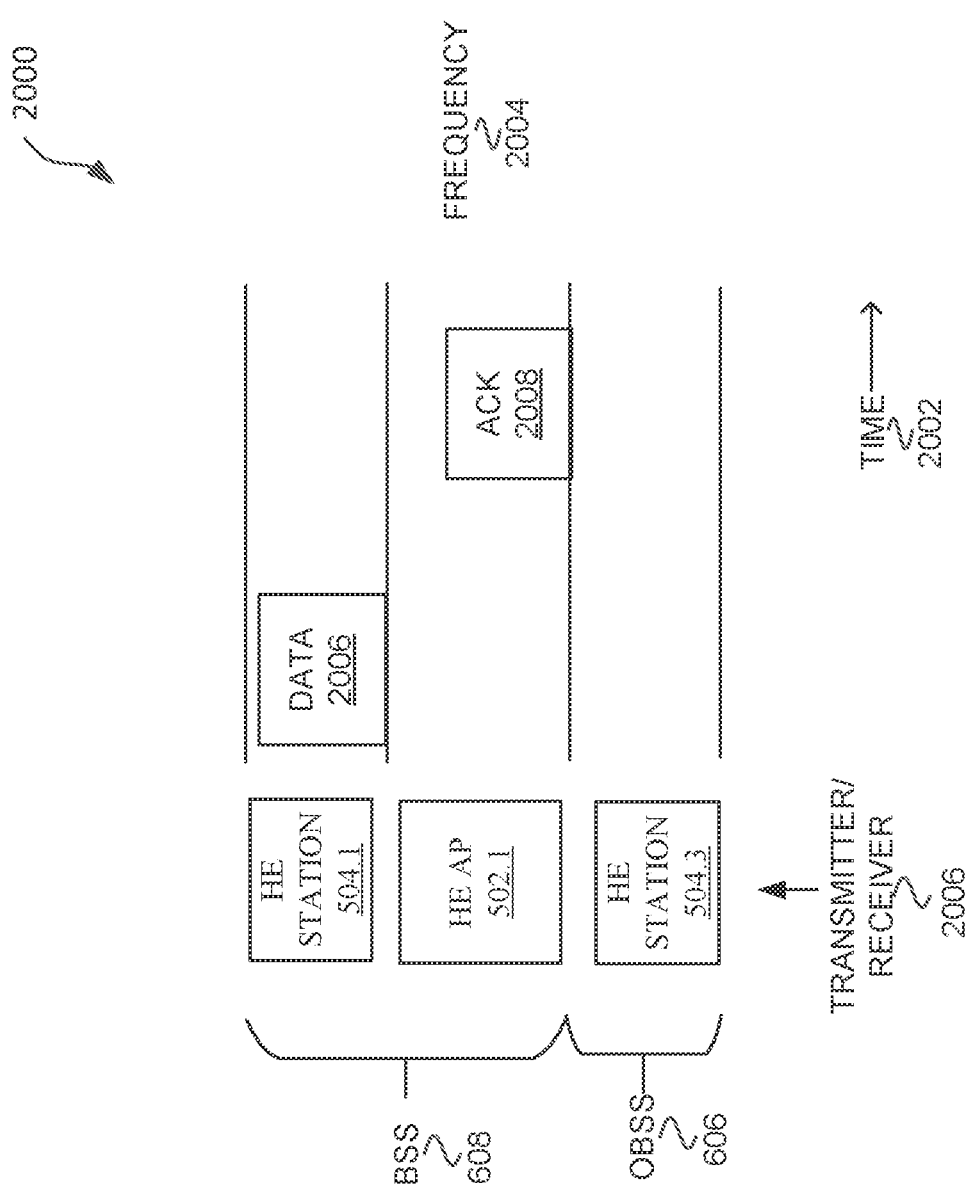
FIG. 20 illustrates a method for classification of BSSs based on TXOP holder address in accordance with some embodiments.

FIG. 20 illustrates a method 2000 for classification of BSSs based on TXOP holder address in accordance with some embodiments. Illustrated in FIG. 20 is time 2002 along a horizontal axis, frequency 2004 along a vertical axis, transmitter/receiver 2006 along a vertical axis, BSS 606, and OBSS 608 along a vertical axis. HE station 504.1 and HE AP 502.1 are part of BSS 608 (FIG. 6); and, HE station 504.3 is part of OBSS 606.

The method 2000 begins with a HE station 504.1 transmitting data 2006 frame (e.g., data 1300 frame) to HE AP 502.1. HE station 504.3 decodes the data 2006 frame. Referring to FIG. 13, the RA 1308 of the data 2006 may be HE AP 502.1 and the TA 1310 may be HE station 504.1. The duration 1306 may be a duration remaining in a TXOP. HE station 504.3 may classify (e.g., using classifier 802) data 2006 as an inter-BSS frame, e.g., based on neither the RA 1308 or the TA 1310 matching a BSSID 806 (FIG. 8) of the HE station 502.3. HE station 504.3 may record the TXOP address 814.1 (e.g., TA 1310 of the data 2006 frame, which would be the MAC address of HE station 504.1.) HE station 502.2 may set basic NAV 810 to the duration 1306, if the duration 1306 is greater than a current duration of the basic NAV 810. HE station 502.2 may set classification 816 to inter-BSS to indicate that the TXOP address 814.1 is classified as an inter-BSS. In some embodiments, the classification 816 may include unclassified and inter-BSS.

The method 2000 continues with the HE AP 502.1 transmitting an ACK 2008. HE station 504.3 decodes the ACK 2008. HE station 504.3 compares the TXOP holder address of the ACK 2008 (e.g., RA 1008) with the stored TXOP address 814.1 associated with the basic NAV 810. The TXOP address 814.1 was stored as the MAC address of HE station 504.1, which is compared with the RA 908 of the ACK 2008, which is the MAC address of HE station 504.1. Since, there is a match with TXOP address 814.1, which is associated with the basic NAV 810 and the classification 816 indicates inter-BSS, the HE station 504.3 classifies (e.g., using classifier 802) ACK 2008 as an inter-BSS ACK 2008.

Figure 21:
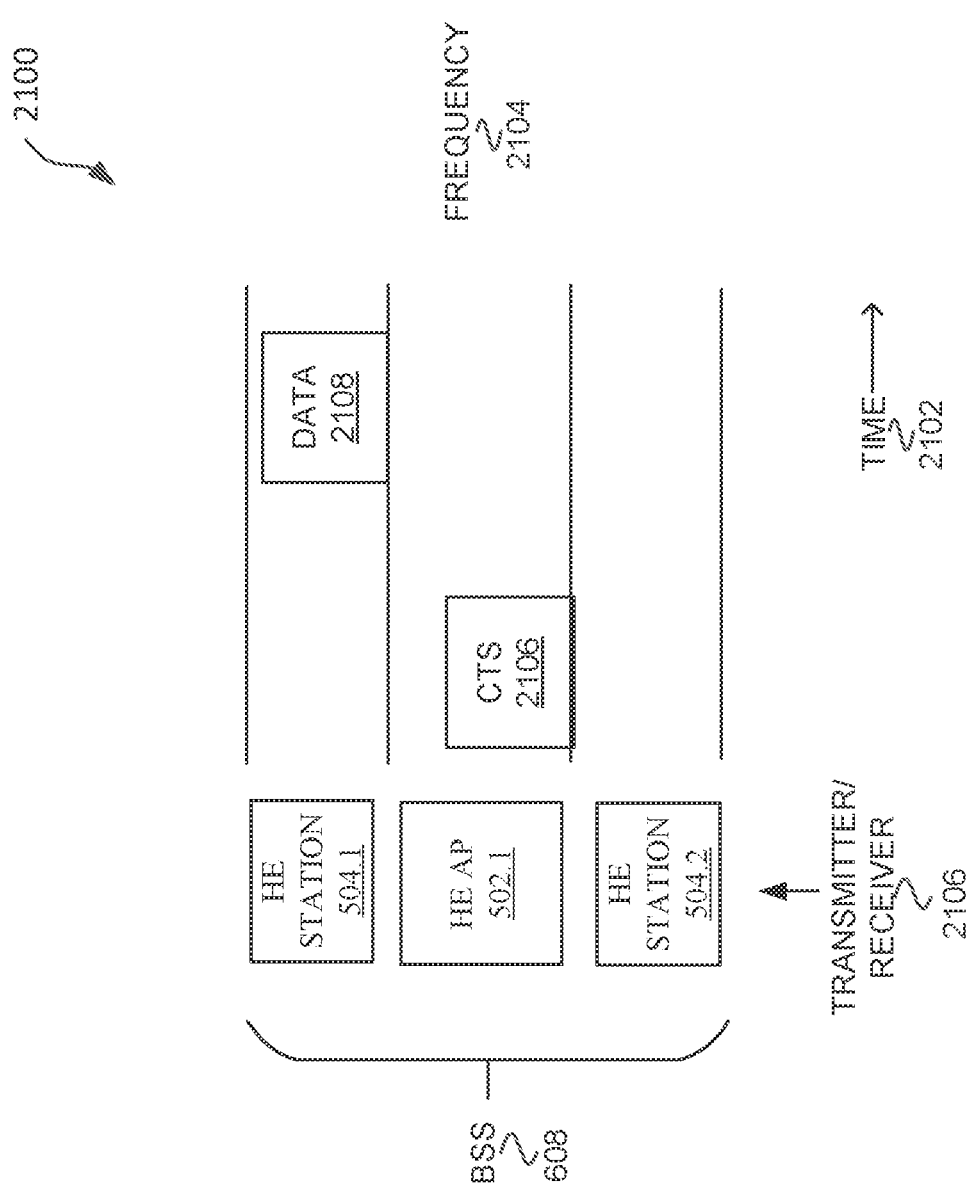
FIG. 21 illustrates a method for classification of BSSs based on TXOP holder address in accordance with some embodiments.

FIG. 21 illustrates a method 2100 for classification of BSSs based on TXOP holder address in accordance with some embodiments. Illustrated in FIG. 21 is time 2102 along a horizontal axis, frequency 2104 along a vertical axis, transmitter/receiver 2106 along a vertical axis, and BSS 608 along a vertical axis. HE station 504.1, HE station 504.2, and HE AP 502.1 are part of BSS 608 (FIG. 6).

The method 2100 begins with a HE AP 502.1 transmitting a CTS 2106 frame (e.g., CTS 900 frame) to HE station 504.1 (e.g., in response to a RTS 1200 from HE station 504.1, which have not been decoded properly by HE station 504.2). HE station 504.2 decodes the CTS 2106 frame. Referring to FIG. 9, the RA 908 of the CTS 2106 frame may be HE station 504.1. The duration 906 may be a duration remaining in a TXOP. HE station 502.2 may not be able to classify (e.g., using classify 802) the CTS 2106 frame (e.g., as an intra-BSS frame or inter-BSS frame) based only on the RA 908 of CTS 2106 (the MAC address of HE station 504.1). HE station 502.2 may record/store in TXOP address 814.1 the TXOP address of the CTS 2106 frame (e.g., RA 910 of the CTS 2106 frame, which would be MAC address of HE station 504.1.) HE station 504.2 may set basic NAV 812 to the duration 906, if the duration 906 is greater than a current duration of the basic NAV 810. HE station 504.2 sets classification 816 as unclassified to indicate that HE station 504.2 could not determine if the CTS 2106 frame was an inter-BSS frame or an intra-BSS frame, in accordance with some embodiments.

The method 2100 continues with the HE station 504.1 transmitting a data 2108. HE station 504.2 decodes the data 2108. Referring to FIG. 13, the RA 1308 of the data 2108 may be HE AP 502.1 and the TA 1310 may be HE station 504.1. The duration 1306 may be a duration remaining in a TXOP. HE station 504.2 compares the TXOP holder address of the data 2108 (e.g., TA 1310) with the stored TXOP address 814.1 associated with the basic BSS NAV 810. The TXOP address 814.1 was stored as the MAC address of HE station 504.1, which is compared with the TA 1310 of the data 2108 (which may be the TXOP holder of the data 2108 frame), which is the MAC address of HE station 504.1. Since, there is a match and TXOP address 814.1 is associated with the basic NAV 812, the HE station 504.2 classifies the TXOP address 814.1 that set the basic NAV 810 as an intra-BSS frame. The HE station 504.2 then performs a method to update the NAV 810, 812 based on the new classification. For example, the HE station 504.2 may set the intra-BSS NAV 812 to the value of the basic NAV 810 and set the TXOP address 814.2 of the intra-BSS NAV 812 to the TXOP address 814.1 of the basic NAV 810, if the value of the basic NAV 810 is larger than the value of the intra-BSS NAV 812. The HE station 504.2 may then reset the basic NAV 810 to zero, and reset the classification 816 to indicate it is not in use, in accordance with some embodiments.

HE station 504.2 may then determine whether duration 1306 of the data 2108 is greater than the value of the intra-BSS NAV 812, and if so set the intra-BSS NAV 812 to the value of the duration 1306, in accordance with some embodiments. The HE station 504.2 may update the intra-BSS NAV 812 in a different order, e.g., the HE station 504.2 may first update the intra-BSS NAV 812 with the duration 1306, and then update the intra-BSS NAV 812 with the basic NAV 810.

Figure 22:
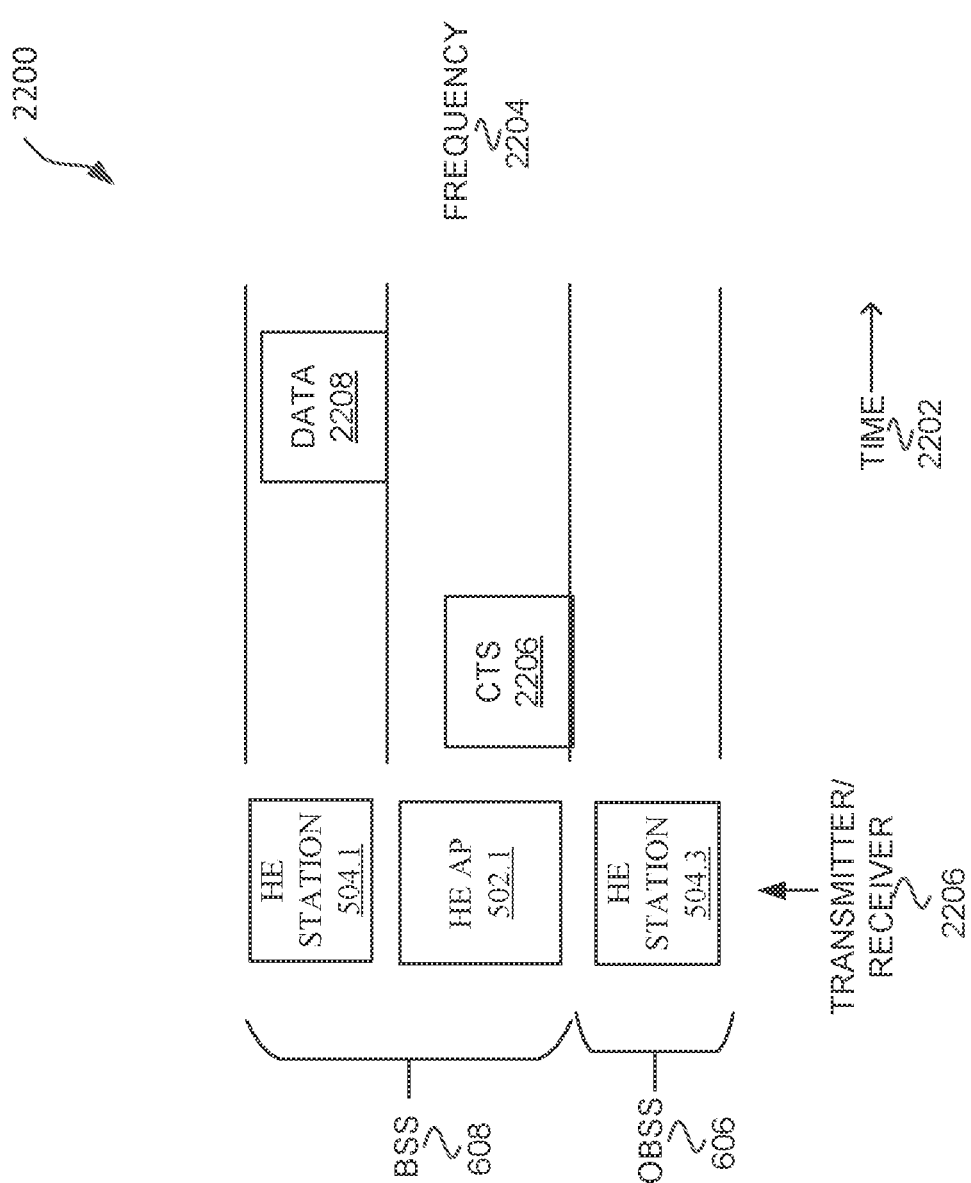
FIG. 22 illustrates a method for classification of BSSs based on TXOP holder address in accordance with some embodiments.

FIG. 22 illustrates a method 2200 for classification of BSSs based on TXOP holder address in accordance with some embodiments. Illustrated in FIG. 22 is time 2202 along a horizontal axis, frequency 2204 along a vertical axis, transmitter/receiver 2206 along a vertical axis, BSS 606, and OBSS 608 along a vertical axis. HE station 504.1 and HE AP 502.1 are part of BSS 608 (FIG. 6). HE station 504.3 is part of OBSS 606.

The method 2200 begins with a HE AP 502.1 transmitting a CTS 2206 frame (e.g., CTS 900 frame) to HE station 504.1 (e.g., in response to a RTS 1200 from HE station 504.1, which have not been decoded properly by HE station 504.3). HE station 504.3 decodes the CTS 2206 frame. Referring to FIG. 9, the RA 908 of the CTS 2206 frame may be HE station 504.1. The duration 906 may be a duration remaining in a TXOP. HE station 504.3 may not be able to classify (e.g., using classify 802) the CTS 2206 frame (e.g., as an intra-BSS frame or inter-BSS frame) based only on the RA 908 of the CTS 2206 frame (e.g., the MAC address of HE station 504.1). HE station 502.3 may record/store in TXOP address 814.1 the TXOP address of CTS 2206 (e.g., RA 910 of the CTS 2206 frame, which would be MAC address of HE station 504.1.) HE station 504.3 may set basic NAV 812 to the duration 906, if the duration 906 is greater than a current duration of the basic NAV 810. HE station 504.3 sets classification 816 as unclassified to indicate that HE station 504.3 could not determine if the CTS 2206 frame was an inter-BSS frame or an intra-BSS frame, in accordance with some embodiments.

The method 2200 continues with the HE station 504.1 transmitting a data 2208. HE station 504.3 decodes the data 2208. Referring to FIG. 13, the RA 1308 of the data 2208 may be HE AP 502.1 and the TA 1310 may be HE station 504.1. The duration 1306 may be a duration remaining in a TXOP. HE station 504.3 compares the TXOP holder address of the data 2208 (e.g., TA 1310) with the stored TXOP address 814.1 associated with the basic BSS NAV 810. The TXOP address 814.1 was stored as the MAC address of HE station 504.1, which is compared with the TA 1310 of the data 2208 (which may be the TXOP holder of the data 2208 frame), which is the MAC address of HE station 504.1. Since, there is a match and TXOP address 814.1 is associated with the basic NAV 812, the HE station 504.3 classifies the TXOP address 814.1 that set the basic NAV 810 as an inter-BSS frame. HE station 504.3 may set classification 816 to inter-BSS frame in accordance with some embodiments.

It should be noted that the frames RTS 1606, CTS 1608, RTS 1706, CTS 1708, MU-RTS 1806, CTS 1808, data 1906, ACK 1908, data 2006, ACK 2008, CTS 2106, data 2108, CTS 2206, and data 2208 are example frames. The methods and operations disclosed herein may be used for other types of frames.

Figure 23:
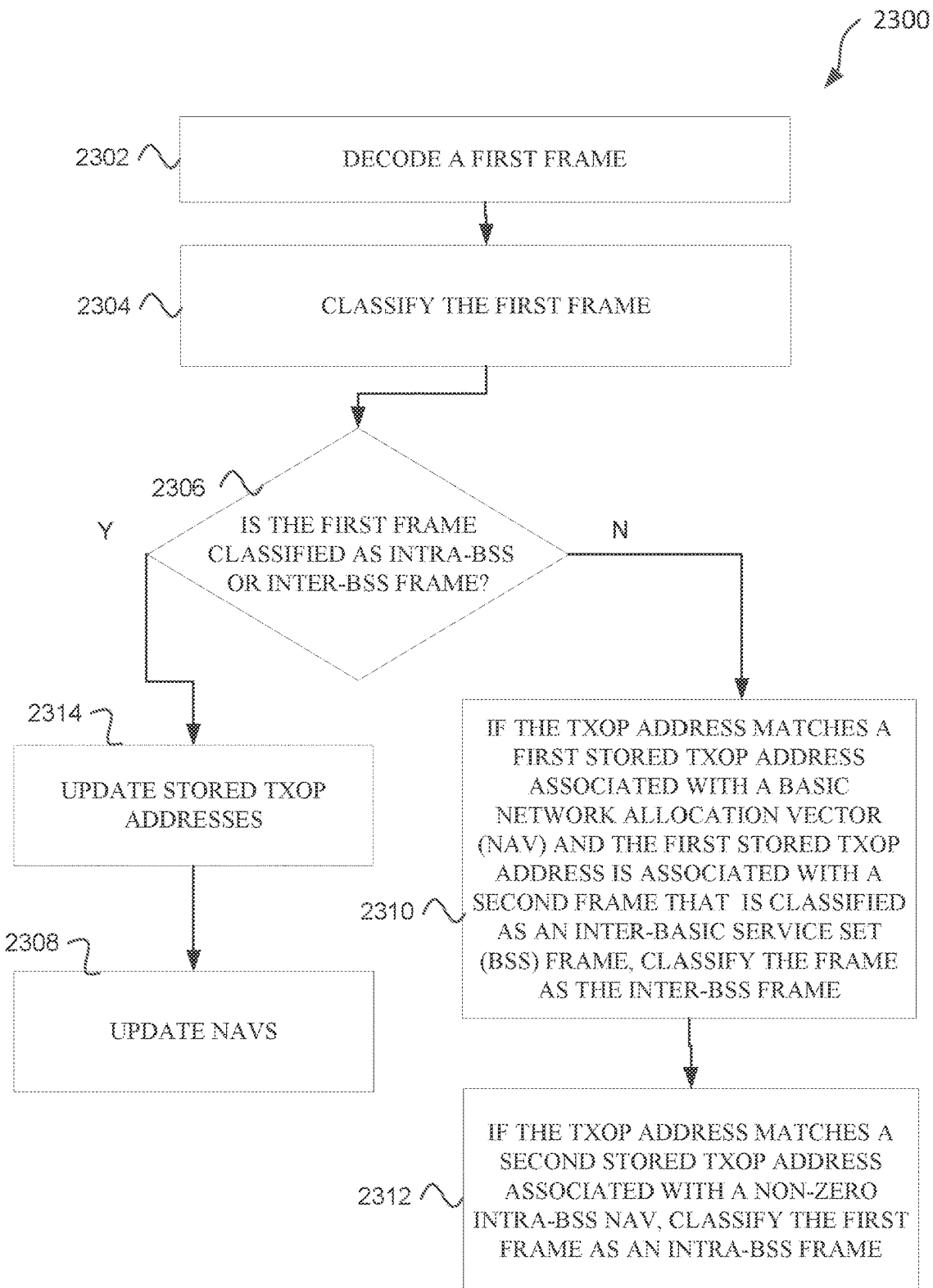
FIG. 23 illustrates a method for classification of BSSs based on TXOP holder address in accordance with some embodiments.

FIG. 23 illustrates a method 2300 for classification of BSSs based on TXOP holder address in accordance with some embodiments. The method 2300 begins at operation 2302 with decoding a first frame. For example, HE station 504.3 (FIG. 22) decoding data 2208, HE station 504.2 (FIG. 21) decoding data 2108, HE station 504.3 (FIG. 20) decoding ACK 2008, HE station 504.2 decoding ACK 1908, HE station 504.3 decoding CTS 1808, HE station 504.3 decoding CTS 1708, or HE station 504.2 decoding CTS 1608.

The method 2300 continues at operation 2304 with classifying the first frame. For example, HE station 504.3 (FIG. 22) trying to classify data 2208, HE station 504.2 (FIG. 21)

trying to classify data 2108, HE station 504.3 (FIG. 20) trying to classify ACK 2008, HE station 504.2 trying to classify ACK 1908, HE station 504.3 trying to classify CTS 1808, HE station 504.3 trying to classify CTS 1708, or HE station 504.2 trying to classify CTS 1608. HE station 504.2 and/or HE station 504.1 may use classify 1502 as disclosed herein to try to classify the frame.

The method 2300 continues at operation 2306 with is the first frame classified as an intra-BSS or inter-BSS frame. For example, HE station 504.3 (FIG. 22) may determine if data 2208 is classified as an intra-BSS or inter-BSS frame, HE station 504.2 (FIG. 21) may determine if data 2108 is classified as an intra-BSS or inter-BSS frame, HE station 504.3 (FIG. 20) may determine if ACK 2008 is classified as an intra-BSS or inter-BSS frame, HE station 504.2 may determine if ACK 1908 is classified as an intra-BSS or inter-BSS frame, HE station 504.3 may determine if CTS 1808 is classified as an intra-BSS or inter-BSS frame, HE station 504.3 may determine if CTS 1708 is classified as an intra-BSS or inter-BSS frame, or HE station 504.2 may determine if CTS 1608 is classified as an intra-BSS or inter-BSS frame. HE station 504.2 and/or HE station 504.1 may use the results of classification 1506.

The method 2300 optionally continues at operation 2314 with updating stored TXOP address, if the first frame is classified as an intra-BSS or inter-BSS frame. Operation 2314 is disclosed below. The method 2300 continues at operation 2308 with updating NAVs. For example, in FIGS. 16-22, HE station 504.1 and HE station 504.2 may update their NAVs, e.g., basic NAV 810 and intra-BSS NAV 812 based on the decoded frame.

If the frame is not classified as an intra-BSS or inter-BSS frame, then the method 2300 continues at operation 2310 with classifying the first frame as the inter-BSS frame, if the TXOP address matches a first stored TXOP address associated with a basic NAV and the first stored TXOP address is classified as an inter-BSS frame. In some embodiments, operation 2310 may be classifying the frame as the inter-BSS frame, if the TXOP address matches a first stored TXOP address associated with a basic NAV and the first stored TXOP address is associated with a second frame classified as an inter-BSS frame. In some embodiments, a TXOP address may be said to be unclassified, classified as an inter-BSS frame, or classified as an intra-BSS frame, if the frame that comprised the TXOP address is unclassified, classified as an inter-BSS frame, or classified as an intra-BSS frame, respectfully.

For example, HE station 504.3 (FIG. 20) may classify ACK 2008 as an inter-BSS frame because the TXOP holder address of the ACK 2008 (e.g., RA 1008) matches with the stored TXOP address 814.1 associated with the basic NAV 810. For example, HE station 504.3 (FIG. 18) may classify CTS 1808 as an inter-BSS frame because the TXOP holder address of the CTS 1808 (e.g., RA 908) matches with the stored TXOP address 814.1 associated with the basic NAV 810. For example, HE station 504.3 may classify CTS 1708 as an inter-BSS frame because the TXOP holder address of the CTS 1708 (e.g., RA 908) matches with the stored TXOP address 814.1 associated with the basic NAV 810.

The method 2300 continues at operation 2312 with classifying the first frame as an intra-BSS frame, if the TXOP address matches a second stored TXOP address associated with a non-zero intra-BSS NAV.

For example, HE station 504.2 may classify CTS 1608 as an intra-BSS frame because the TXOP holder address of the CTS 1608 (e.g., RA 908) matches with the stored TXOP address 814.2 associated with the intra-BSS NAV 812. For example, HE station 504.2 may classify ACK 1908 as an intra-BSS frame because the TXOP holder address of the ACK 1908 (e.g., RA 1008) matches with the stored TXOP address 814.2 associated with the intra-BSS NAV 812.

In some embodiments, the method 2300 may optionally continue at operation 2314 with updating unclassified stored TXOP address. For example, if the TXOP address of the first frame matches a stored TXOP address that is associated with a frame that is not classified, then classify the frame associated with the stored TXOP as the intra-BSS frame if the first frame is classified as the intra-BSS frame, and classify the frame associated with the stored TXOP as the inter-BSS frame if the TXOP address of the first frame is classified as the inter-BSS frame. For example, as disclosed in conjunction with FIG. 22, HE station 504.3 may update stored TXOP address of CTS 2206 based on classifying data 2208 as an inter-BSS frame by matching the TXOP address of data 2208 with the TXOP address of CTS 2206. For example, as disclosed in conjunction with FIG. 21, HE station 504.2 may update the TXOP address of CTS 2106 based on classifying data 2108 frame as an intra-BSS frame and matching the TXOP address of data 2108 with the TXOP address of the CTS 2106.

In some embodiments, the method 2300 may continue with the HE station updating the NAV, if the first frame has been classified as an intra-BSS or inter-BSS. The method 2300 may continue with the HE station updating its NAVs based on a duration of the decoded first frame. In some embodiments, the operations of method 2300 may be in a different order and the method 2300 may be performed by a HE AP 502, HE station 502, an apparatus of a HE AP 502, and/or an apparatus of a HE station 504. In some embodiments, one or more of the operations of method 2300 may be optional, e.g., 2314.

Figure 24:
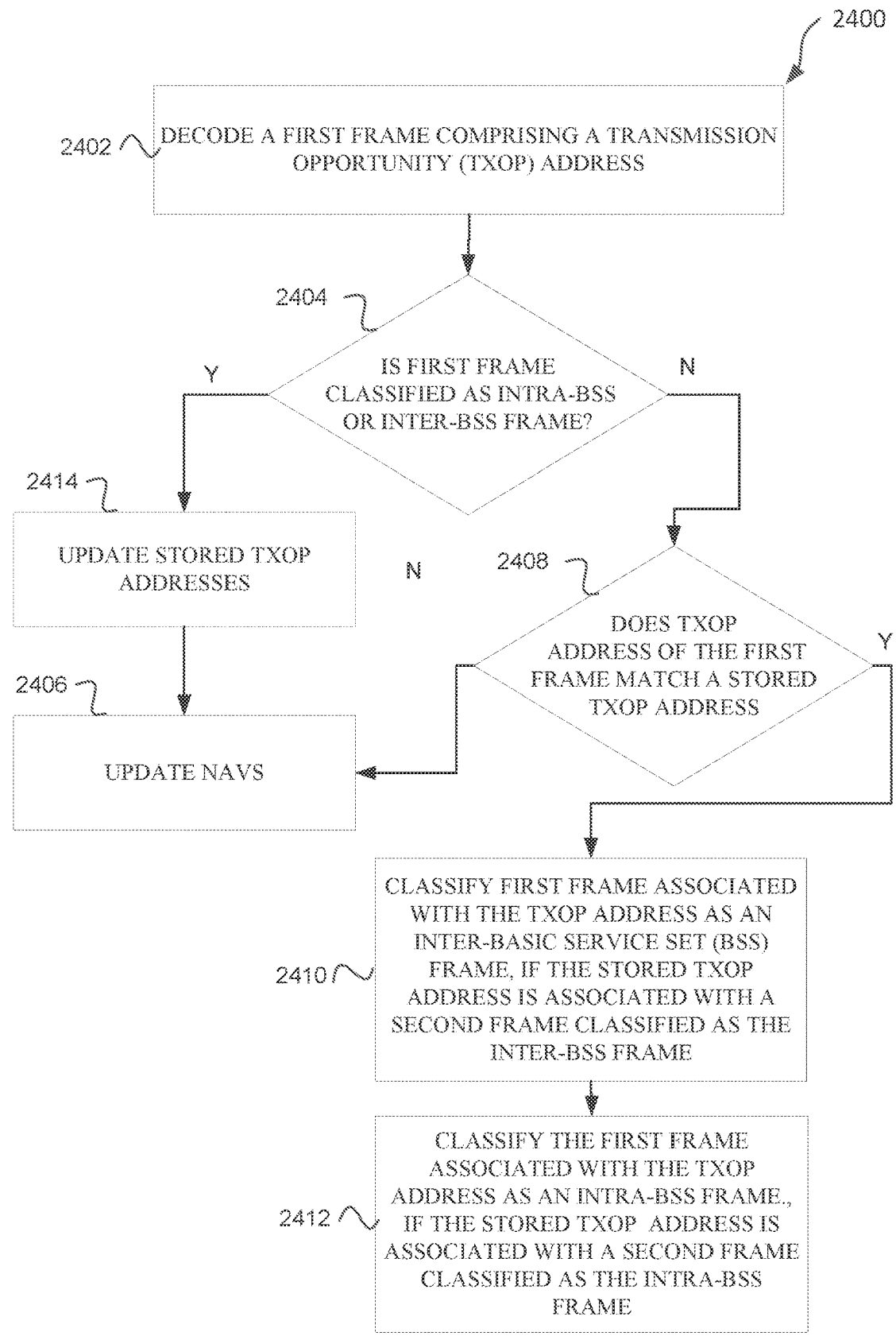
FIG. 24 illustrates a method for classification of BSSs based on TXOP holder address in accordance with some embodiments.

FIG. 24 illustrates a method 2400 for classification of BSSs based on TXOP holder address in accordance with some embodiments. The method 2400 begins at operation 2402 with decoding a first frame with a TXOP address. For example, HE station 504.3 (FIG. 22) decoding data 2208, HE station 504.2 (FIG. 21) decoding data 2108, HE station 504.3 (FIG. 20) decoding ACK 2008, HE station 504.2 decoding ACK 1908, HE station 504.3 decoding CTS 1808, HE station 504.3 decoding CTS 1708, or HE station 504.2 decoding CTS 1608.

The method 2400 continues at operation 2404 with is the first frame classified as an intra-BSS or inter-BSS frame. For example, HE station 504.3 (FIG. 22) may determine if data 2208 is classified as an intra-BSS or inter-BSS frame, HE station 504.2 (FIG. 21) may determine if data 2108 is classified as an intra-BSS or inter-BSS frame, HE station 504.3 (FIG. 20) may determine if ACK 2008 is classified as an intra-BSS or inter-BSS frame, HE station 504.2 may determine if ACK 1908 is classified as an intra-BSS or inter-BSS frame, HE station 504.3 may determine if CTS 1808 is classified as an intra-BSS or inter-BSS frame, HE station 504.3 may determine if CTS 1708 is classified as an intra-BSS or inter-BSS frame, or HE station 504.2 may determine if CTS 1608 is classified as an intra-BSS or inter-BSS frame. HE station 504.2 and/or HE station 504.1 may use the results of classification 1506.

The method 2400 continues at operation 2306 with updating NAVs, if the first frame is classified as an intra-BSS or inter-BSS frame. For example, in FIGS. 16-22, HE station 504.1 and HE station 504.2 may update their NAVs, e.g., basic NAV 810 and intra-BSS NAV 812 based on the decoded frame.

If the frame is not classified as the intra-BSS or inter-BSS frame, then the method 2400 continues at operation 2408 with does TXOP address of the first frame match a stored TXOP address. For example, HE station 504.3 (FIG. 22) determine if a TXOP address of data 2208 matches a stored TXOP address, HE station 504.2 (FIG. 21) determine if a TXOP address of data 2108 matches a stored TXOP address, HE station 504.3 (FIG. 20) determine if a TXOP address of ACK 2008 matches a stored TXOP address, HE station 504.2 determine if a TXOP address of ACK 1908 matches a stored TXOP address, HE station 504. determine if a TXOP address of CTS 1808 matches a stored TXOP address, HE station 504.3 determine if a TXOP address of CTS 1708 matches a stored TXOP address, or HE station 504.2 determine if a TXOP address of CTS 1608 matches a stored TXOP address. HE station 504.2 and/or HE station 504.1 may use classify 1502 as disclosed herein to try to classify the frame.

If the TXOP address of the first frame does not match the stored TXOP address, then the method 2400 may continue at operation 2414 and then 2406 as disclosed herein.

If the TXOP address of the first frame does match the stored TXOP address, then the method 2400 continues at operation 2410 with classifying the first frame associated with the TXOP address as an inter-basic service set (BSS) frame, if the stored TXOP address is associated with a second frame that is classified as the inter-BSS frame. For example, HE station 504.3 (FIG. 20) may classify ACK 2008 as an inter-BSS frame because the TXOP holder address of the ACK 2008 (e.g., RA 1008) matches with the stored TXOP address 814.1 associated with the basic NAV 810. For example, HE station 504.3 (FIG. 18) may classify CTS 1808 as an inter-BSS frame because the TXOP holder address of the CTS 1808 (e.g., RA 908) matches with the stored TXOP address 814.1 associated with the basic NAV 810. For example, HE station 504.3 may classify CTS 1708 as an inter-BSS frame because the TXOP holder address of the CTS 1708 (e.g., RA 908) matches with the stored TXOP address 814.1 associated with the basic NAV 810.

The method 2400 may continue at operation 2412 with classifying the first frame associated with the TXOP address as an intra-BSS frame, if the stored TXOP address is associated with a second frame that is classified as the intra-BSS frame. For example, HE station 504.2 may classify CTS 1608 as an intra-BSS frame because the TXOP holder address of the CTS 1608 (e.g., RA 908) matches with the stored TXOP address 814.2 associated with the intra-BSS NAV 812 (and a second frame associated with TXOP address 814.2 was classified as the intra-BSS frame). For example, HE station 504.2 may classify ACK 1908 as an intra-BSS frame because the TXOP holder address of the ACK 1908 (e.g., RA 1008) matches with the stored TXOP address 814.2 associated with the intra-BSS NAV 812. In some embodiments, the method 2400 may continue with the HE station updating the NAV, if the frame has been classified as an intra-BSS or inter-BSS. The method 2400 may continue with the HE station updating its NAVs based on a duration of the decoded first frame. In some embodiments, the operations of method 2400 may be in a different order and the method 2400 may be performed by a HE AP 502, HE station 502, an apparatus of a HE AP 502, and/or an apparatus of a HE station 504.

In some embodiments, the method 2400 may continue with the HE station updating the NAV, if the frame has been classified as an intra-BSS or inter-BSS. The method 2400 may continue with the HE station updating its NAVs based on a duration of the decoded frame. In method 2400, the operations may be in a different order and the method 2400 may be performed by a HE AP 502, HE station 502, an apparatus of a HE AP 502, and/or an apparatus of a HE station 504.

In some embodiments, the method 2400 may optionally continue at operation 2414 with updating unclassified stored TXOP address. For example, if the TXOP address of the frame matches a stored TXOP address that is not classified, then classify the stored TXOP as the intra-BSS frame if the TXOP address is classified as the intra-BSS frame, and classify the stored TXOP as the inter-BSS frame if the TXOP address of the frame is classified as the inter-BSS frame. For example, as disclosed in conjunction with FIG. 22, HE station 504.3 may update stored TXOP address of CTS 2206 based on classifying data 2208 as an inter-BSS frame by matching the TXOP address of data 2208 with the TXOP address of CTS 2206. For example, as disclosed in conjunction with FIG. 21, HE station 504.2 may update the TXOP address of CTS 2106 based on classifying data 2108 frame as an intra-BSS frame and matching the TXOP address of data 2108 with the TXOP address of the CTS 2106.

Figure 25:
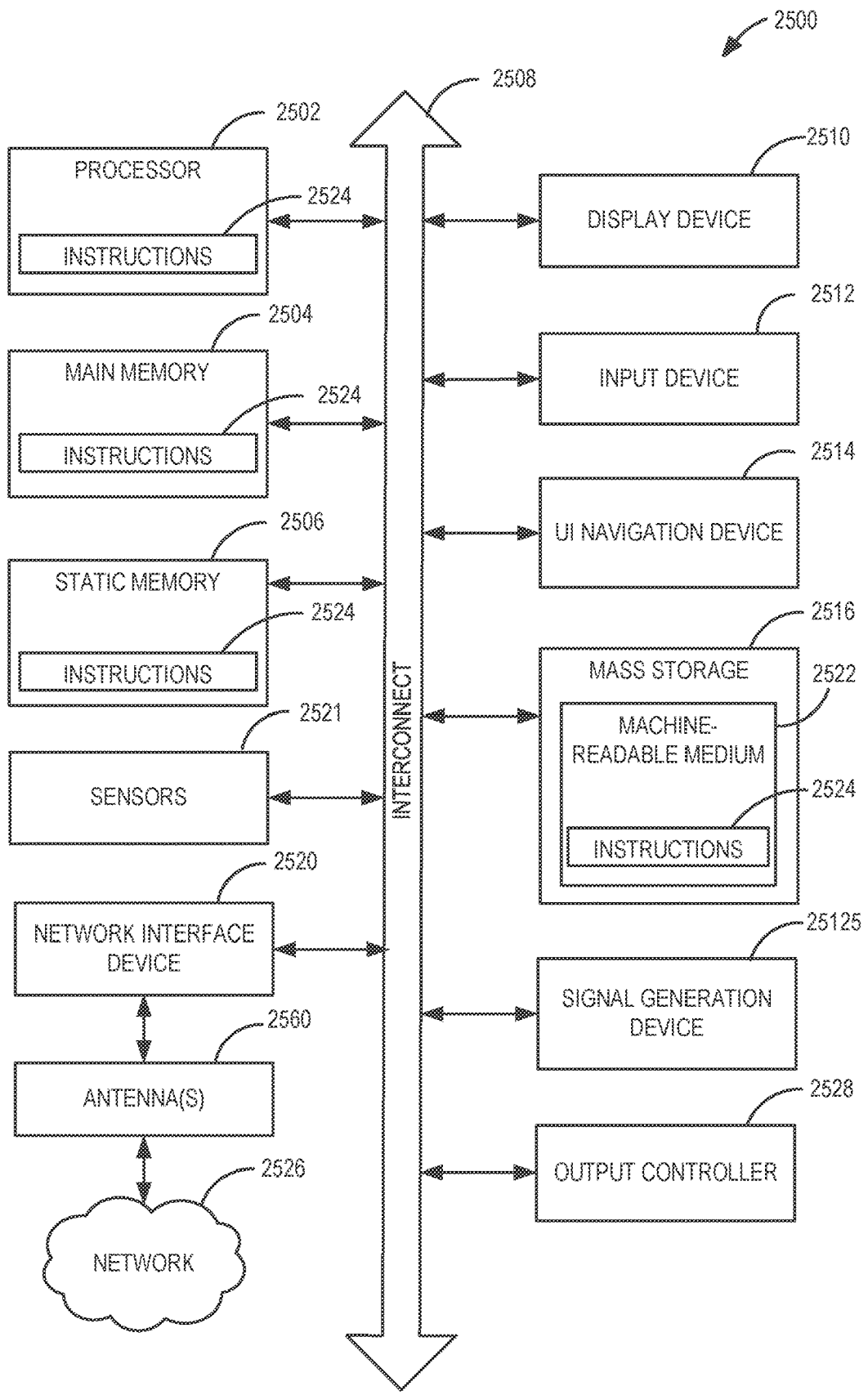
FIG. 25 illustrates a block diagram of an example machine upon which any one or more of the techniques (e.g., methodologies) discussed herein may perform.

FIG. 25 illustrates a block diagram of an example machine 2500 upon which any one or more of the techniques (e.g., methodologies) discussed herein may perform. In alternative embodiments, the machine 2500 may operate as a standalone device or may be connected (e.g., networked) to other machines. In a networked deployment, the machine 2500 may operate in the capacity of a server machine, a client machine, or both in server-client network environments. In an example, the machine 2500 may act as a peer machine in peer-to-peer (P2P) (or other distributed) network environment. The machine 2500 may be a AP 102, HE station 104, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 2500 may include a hardware processor 2502 (e.g., a central processing unit (CPU), a graphics processing unit (GPU), a hardware processor core, or any combination thereof), a main memory 2504 and a static memory 2506, some or all of which may communicate with each other via an interlink (e.g., bus) 2508.

Specific examples of main memory 2504 include Random Access Memory (RAM), and semiconductor memory devices, which may include, in some embodiments, storage locations in semiconductors such as registers. Specific examples of static memory 2506 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 2500 may further include a display device 2510, an input device 2512 (e.g., a keyboard), and a user interface (UI) navigation device 2514 (e.g., a mouse). In an example, the display device 2510, input device 2512 and UI navigation device 2514 may be a touch screen display. The machine 2500 may additionally include a mass storage (e.g., drive unit) 2516, a signal generation device 2518 (e.g., a speaker), a network interface device 2520, and one or more sensors 2521, such as a global positioning system (GPS) sensor, compass, accelerometer, or other sensor. The machine 2500 may include an output controller 2528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 2502 and/or instructions 2524 may comprise processing circuitry and/or transceiver circuitry.

The storage device 2516 may include a machine readable medium 2522 on which is stored one or more sets of data structures or instructions 2524 (e.g., software) embodying or utilized by any one or more of the techniques or functions described herein. The instructions 2524 may also reside, completely or at least partially, within the main memory 2504, within static memory 2506, or within the hardware processor 2502 during execution thereof by the machine 2500. In an example, one or any combination of the hardware processor 2502, the main memory 2504, the static memory 2506, or the storage device 2516 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 2522 is illustrated as a single medium, the term "machine readable medium" may include a single medium or multiple media (e.g., a centralized or distributed database, and/or associated caches and servers) configured to store the one or more instructions 2524.

An apparatus of the machine 2500 may be one or more of a hardware processor 2502 (e.g., a central processing unit (CPU), a graphics processing unit (GPU), a hardware processor core, or any combination thereof), a main memory 2504 and a static memory 2506, sensors 2521, network interface device 2520, antennas 2560, a display device 2510, an input device 2512, a UI navigation device 2514, a mass storage 2516, instructions 2524, a signal generation device 2518, and an output controller 2528. The apparatus may be configured to perform one or more of the methods and/or operations disclosed herein. The apparatus may be intended as a component of the machine 2500 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 2500 and that cause the machine 2500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 2524 may further be transmitted or received over a communications network 2526 using a transmission medium via the network interface device 2520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 2520 may include one or more physical jacks (e.g., Ethernet, coaxial, or phone jacks) or one or more antennas to connect to the communications network 2526. In an example, the network interface device 2520 may include one or more antennas 2560 to wirelessly communicate using at least one of single-input multiple-output (SIMO), multiple-input multiple-output (MIMO), or multiple-input single-output (MISO) techniques. In some examples, the network interface device 2520 may wirelessly communicate using Multiple User MIMO techniques. The term "transmission medium" shall be taken to include any intangible medium that is capable of storing, encoding or carrying instructions for execution by the machine 2500, and includes digital or analog communications signals or other intangible medium to facilitate communication of such software.

Figure 26:
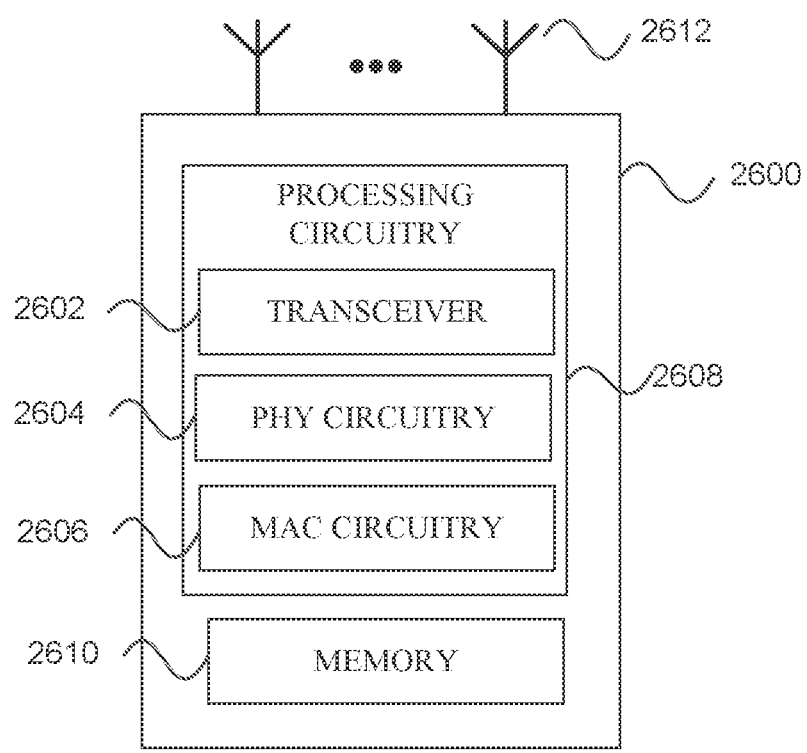
FIG. 26 illustrates a block diagram of an example wireless device upon which any one or more of the techniques (e.g., methodologies or operations) discussed herein may perform.

FIG. 26 illustrates a block diagram of an example wireless device 2600 upon which any one or more of the techniques (e.g., methodologies or operations) discussed herein may perform. The wireless device 2600 may be a HE device. The wireless device 2600 may be a HE STA 504 and/or HE AP 502 (e.g., FIG. 5). A HE STA 504 and/or HE AP 502 may include some or all of the components shown in FIGS. 1-6 or FIGS. 25 and 26. The wireless device 2600 may be an example machine 2500 as disclosed in conjunction with FIG. 25.

The wireless device 2600 may include processing circuitry 2608. The processing circuitry 2608 may include a transceiver 2602, physical layer circuitry (PHY circuitry) 2604, and MAC layer circuitry (MAC circuitry) 2606, one or more of which may enable transmission and reception of signals to and from other wireless devices 2600 (e.g., HE AP 502, HE STA 504, and/or legacy devices 506) using one or more antennas 2612. As an example, the PHY circuitry 2604 may perform various encoding and decoding functions that may include formation of baseband signals for transmission and decoding of received signals. As another example, the transceiver 2602 may perform various transmission and reception functions such as conversion of signals between a baseband range and a Radio Frequency (RF) range.

Accordingly, the PHY circuitry 2604 and the transceiver 2602 may be separate components or may be part of a combined component, e.g., processing circuitry 2608. In addition, some of the described functionality related to transmission and reception of signals may be performed by a combination that may include one, any or all of the PHY circuitry 2604 the transceiver 2602, MAC circuitry 2606, memory 2610, and other components or layers. The MAC circuitry 2606 may control access to the wireless medium. The wireless device 2600 may also include memory 2610 arranged to perform the operations described herein, e.g., some of the operations described herein may be performed by instructions stored in the memory 2610.

The antennas 2612 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 2612 may be effectively separated to take advantage of spatial diversity and the different channel characteristics that may result.

One or more of the memory 2610, the transceiver 2602, the PHY circuitry 2604, the MAC circuitry 2606, the antennas 2612, and/or the processing circuitry 2608 may be coupled with one another. Moreover, although memory 2610, the transceiver 2602, the PHY circuitry 2604, the MAC circuitry 2606, the antennas 2612 are illustrated as separate components, one or more of memory 2610, the transceiver 2602, the PHY circuitry 2604, the MAC circuitry 2606, the antennas 2612 may be integrated in an electronic package or chip.

In some embodiments, the wireless device 2600 may be a mobile device as described in conjunction with FIG. 25. In some embodiments the wireless device 2600 may be configured to operate in accordance with one or more wireless communication standards as described herein (e.g., as described in conjunction with FIGS. 1-6, IEEE 802.11). In some embodiments, the wireless device 2600 may include one or more of the components as described in conjunction with FIG. 25 (e.g., display device 2510, input device 2512, etc.) Although the wireless device 2600 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 2600 may include various components of the wireless device 700 as shown in FIG. 7 and/or components from FIGS. 1-5 and 25. Accordingly, techniques and operations described herein that refer to the wireless device 2600 may be applicable to an apparatus for a wireless device 2600 (e.g., HE AP 502 and/or HE STA 504), in some embodiments. In some embodiments, the wireless device 2600 is configured to decode and/or encode signals, packets, and/or frames as described herein, e.g., PPDUs.

In some embodiments, the MAC circuitry 2606 may be arranged to contend for a wireless medium during a contention period to receive control of the medium for a HE TXOP and encode or decode an HE PPDU. In some embodiments, the MAC circuitry 2606 may be arranged to contend for the wireless medium based on channel contention settings, a transmitting power level, and a clear channel assessment level (e.g., an energy detect level).

The PHY circuitry 2604 may be arranged to transmit signals in accordance with one or more communication standards described herein. For example, the PHY circuitry 2604 may be configured to transmit a HE PPDU. The PHY circuitry 2604 may include circuitry for modulation/demodulation, upconversion/downconversion, filtering, amplification, etc. In some embodiments, the processing circuitry 2608 may include one or more processors. The processing circuitry 2608 may be configured to perform functions based on instructions being stored in a RAM or ROM, or based on special purpose circuitry. The processing circuitry 2608 may include a processor such as a general purpose processor or special purpose processor. The processing circuitry 2608 may implement one or more functions associated with antennas 2612, the transceiver 2602, the PHY circuitry 2604, the MAC circuitry 2606, and/or the memory 2610. In some embodiments, the processing circuitry 2608 may be configured to perform one or more of the functions/operations and/or methods described herein.

In mmWave technology, communication between a station (e.g., the HE stations 504 of FIG. 5 or wireless device 2600) and an access point (e.g., the HE AP 502 of FIG. 5 or wireless device 2600) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

The following examples pertain to further embodiments. Example 1 is an apparatus of a high-efficiency (HE) station including: a memory; and processing circuitry couple to the memory, where the processing circuitry is configured to: decode a first frame including a transmission holder (TXOP) address; if the TXOP address matches a first stored TXOP address associated with a basic network allocation vector (NAV) and the first stored TXOP address is associated with a second frame classified as an inter-basic service set (BSS) frame, classify the first frame as the inter-BSS frame; and if the TXOP address matches a second stored TXOP address associated with a non-zero intra-BSS NAV, classify the first frame as an intra-BSS frame.

In Example 2, the subject matter of Example 1 optionally includes where the processing circuitry is further configured to: if the first frame is classified as the inter-BSS frame, determine whether spatial reuse can be used, and if spatial reuse can be used, encode a third frame and configure the HE station to transmit the third frame.

In Example 3, the subject matter of any one or more of Examples 1-2 optionally include where the processing circuitry is further configured to: if the first frame is a contention-free (CF)-end frame and the first frame is classified as the inter-BSS frame, reset the basic NAV; and if the first frame is the CF-end frame and the first frame is classified as the intra-BSS frame, reset the intra-BSS NAV.

In Example 4, the subject matter of any one or more of Examples 1-3 optionally include where the TXOP address is one from the following group: a receiver address, a transmitter address, and a BSS identification (ID) address.

In Example 5, the subject matter of any one or more of Examples 1-4 optionally include where the processing circuitry is further configured to: classify the first frame as the intra BSS or the inter BSS; if the TXOP address matches the first stored TXOP and the first stored TXOP is associated with the second frame not classified as the intra-BSS frame or the inter-BSS frame, classify the second frame associated with the first stored TXOP as the intra-BSS frame if first frame associated with the TXOP address is classified as the intra-BSS frame, and classify the second frame associated with the first stored TXOP as the inter-BSS frame if the first frame associated with the TXOP address is classified as the inter-BSS frame.

In Example 6, the subject matter of Example 5 optionally includes where the processing circuitry is further configured to: if the second frame associated with the first stored TXOP is classified as the intra-BSS frame, and if a value of the basic NAV is greater than a value of the intra-BSS NAV, set the value of the intra-BSS NAV with the value of the basic NAV; and set the value of the basic NAV to zero.

In Example 7, the subject matter of any one or more of Examples 1-6 optionally include where the first frame further comprises a duration, and where the processing circuitry is further configured to: if the duration is greater than a value of the intra-BSS NAV and the first frame is classified as the intra-BSS frame, set the value of the intra-BSS NAV to the duration and set the second stored TXOP to the TXOP address; and if the duration is greater than a value of the basic NAV and the first frame is not classified as the intra-BSS frame, set the value of the basic NAV to the duration and set the first stored TXOP to the TXOP address.

In Example 8, the subject matter of any one or more of Examples 1-7 optionally include where the processing circuitry is further configured to: decode a third frame before the first frame, the third frame including a second TXOP address; if the third frame is classified as the intra-BSS frame, store the second TXOP address as the second stored TXOP address; and if the third frame is classified as the inter-BSS frame or the third frame is classified as unclassified, store the second TXOP address as the first stored TXOP address.

In Example 9, the subject matter of Example 8 optionally includes where the processing circuitry is further configured to: classify the third frame as the intra-BSS frame if a receiver address of the third frame matches a media access control (MAC) address of a HE access point the HE station is associated with.

In Example 10, the subject matter of any one or more of Examples 8-9 optionally include where the third frame is a request-to-send (RTS) frame and the first frame is a clear-to-send (CTS) frame.

In Example 11, the subject matter of any one or more of Examples 8-10 optionally include where the third frame further comprises a BSS color, and where the processing circuitry is further configured to: classify the third frame as the intra-BSS frame if the BSS color matches a second BSS color of a HE access point the HE station is associated with.

In Example 12, the subject matter of any one or more of Examples 8-11 optionally include where the third frame is a data frame and the first frame is an acknowledgment frame; or, the third frame is a multi-user request-to-send frame, and the first frame is a clear-to-send (CTS) frame.

In Example 13, the subject matter of any one or more of Examples 1-12 optionally include ax station.

In Example 14, the subject matter of any one or more of Examples 1-13 optionally include transceiver circuitry coupled to the memory; and, one or more antennas coupled to the transceiver circuitry.

Example 15 is a non-transitory computer-readable storage medium that stores instructions for execution by one or more processors, the instructions to configure the one or more processors to cause an apparatus of a high-efficiency (HE) station to: decode a frame including a transmission holder (TXOP) address; if the frame is not classified as an intra basic service set (BSS) or inter BSS, and: if the TXOP address matches a first stored TXOP address associated with a basic network allocation vector (NAV) and the first stored TXOP address is classified as an inter-basic service set (BSS) frame, classify the frame as the inter-BSS frame, or if the TXOP address matches a second stored TXOP address associated with a non-zero intra-BSS NAV, classify the frame as an intra-BSS frame.

In Example 16, the subject matter of Example 15 optionally includes where the instructions further configure the one or more processors to cause the apparatus of the HE station to: if the frame is classified as the inter-BSS frame, determine whether spatial reuse can be used, and if spatial reuse can be used, encode a second frame and configure the HE station to transmit the second frame.

In Example 17, the subject matter of any one or more of Examples 15-16 optionally include where the TXOP address is one from the following group: a receiver address, a transmitter address, and a BSS identification (ID) address.

Example 18 is a method performed by an apparatus of a high-efficiency access point, the method including: decoding a first frame including a transmission holder (TXOP) address; classifying the first frame as an inter-basic service set (BSS) frame, if the frame is not classified as the intra BSS frame or inter-BSS frame, and if the TXOP address matches a first stored TXOP address associated with a basic network allocation vector (NAV) and the first stored TXOP address is associated with a second frame classified as the inter-BSS frame; and classifying the first frame as the intra-BSS frame, if the frame is not classified as the intra-BSS or the inter BSS, and if the TXOP address matches a second stored TXOP address associated with a non-zero intra-BSS NAV.

In Example 19, the subject matter of Example 18 optionally includes the method further including: if the first frame is a contention-free (CF)-end frame and the first frame is classified as the inter-BSS frame, resetting the basic NAV; and if the first frame is the CF-end frame and the first frame is classified as the intra-BSS frame, resetting the intra-BSS NAV.

Example 20 is an apparatus of a high-efficiency (HE) access point (AP) including: a memory; and processing circuitry couple to the memory, where the processing circuitry is configured to: decode a first frame including a transmission opportunity (TXOP) address; if the first frame is not classified as an intra basic service set (BSS) or inter BSS, and the TXOP address matches a stored TXOP address, classify the first frame as an inter-basic service set (BSS) frame, if a second frame associated with the stored TXOP address is classified as the inter-BSS frame, or classify the first frame as an intra-BSS frame, if the second frame associated with the stored TXOP address is classified as the intra-BSS frame.

In Example 21, the subject matter of Example 20 optionally includes where the processing circuitry is further configured to: if the first frame is classified as the inter-BSS frame, determine whether spatial reuse can be used, and if spatial reuse can be used, encode a third frame and configure the HE AP to transmit the third frame.

In Example 22, the subject matter of any one or more of Examples 20-21 optionally include where the TXOP address is one from the following group: a receiver address, a transmitter address, and a BSS identification (ID) address.

In Example 23, the subject matter of any one or more of Examples 20-22 optionally include transceiver circuitry coupled to the memory; and, one or more antennas coupled to the transceiver circuitry.

Example 24 is an apparatus of a high-efficiency (HE) station including: means for decoding a first frame including a transmission holder (TXOP) address; if the TXOP address matches a first stored TXOP address associated with a basic network allocation vector (NAV) and the first stored TXOP address is associated with a second frame classified as an inter-basic service set (BSS) frame, means for classifying the first frame as the inter-BSS frame; and if the TXOP address matches a second stored TXOP address associated with a non-zero intra-BSS NAV, classify the first frame as an intra-BSS frame.

In Example 25, the subject matter of Example 24 optionally includes if the first frame is classified as the inter-BSS frame, means for determining whether spatial reuse can be used, and if spatial reuse can be used, means for encoding a third frame and configure the HE station to transmit the third frame.

In Example 26, the subject matter of any one or more of Examples 24-25 optionally include if the first frame is a contention-free (CF)-end frame and the first frame is classified as the inter-BSS frame, means for resetting the basic NAV; and if the first frame is the CF-end frame and the first frame is classified as the intra-BSS frame, means for resetting the intra-BSS NAV.

In Example 27, the subject matter of any one or more of Examples 24-26 optionally include where the TXOP address is one from the following group: a receiver address, a transmitter address, and a BSS identification (ID) address.

In Example 28, the subject matter of any one or more of Examples 24-27 optionally include means for classifying the first frame as the intra BSS or the inter BSS; if the TXOP address matches the first stored TXOP and the first stored TXOP is associated with the second frame not classified as the intra-BSS frame or the inter-BSS frame, means for classifying the second frame associated with the first stored TXOP as the intra-BSS frame if first frame associated with the TXOP address is classified as the intra-BSS frame, and means for classifying the second frame associated with the first stored TXOP as the inter-BSS frame if the first frame associated with the TXOP address is classified as the inter-BSS frame.

In Example 29, the subject matter of Example 28 optionally includes if the second frame associated with the first stored TXOP is classified as the intra-BSS frame, and if a value of the basic NAV is greater than a value of the intra-BSS NAV, means for setting the value of the intra-BSS NAV with the value of the basic NAV; and means for setting the value of the basic NAV to zero.

In Example 30, the subject matter of any one or more of Examples 24-29 optionally include where the first frame further comprises a duration, and further including: if the duration is greater than a value of the intra-BSS NAV and the first frame is classified as the intra-BSS frame, means for setting the value of the intra-BSS NAV to the duration and set the second stored TXOP to the TXOP address; and if the duration is greater than a value of the basic NAV and the first frame is not classified as the intra-BSS frame, means for setting the value of the basic NAV to the duration and set the first stored TXOP to the TXOP address.

In Example 31, the subject matter of any one or more of Examples 24-30 optionally include means for decoding a third frame before the first frame, the third frame including a second TXOP address; if the third frame is classified as the intra-BSS frame, means for storing the second TXOP address as the second stored TXOP address; and if the third frame is classified as the inter-BSS frame or the third frame is classified as unclassified, means for storing the second TXOP address as the first stored TXOP address.

In Example 32, the subject matter of Example 31 optionally includes means for classifying the third frame as the intra-BSS frame if a receiver address of the third frame matches a media access control (MAC) address of a HE access point the HE station is associated with.

In Example 33, the subject matter of any one or more of Examples 31-32 optionally include where the third frame is a request-to-send (RTS) frame and the first frame is a clear-to-send (CTS) frame.

In Example 34, the subject matter of any one or more of Examples 31-33 optionally include where the third frame further comprises a BSS color, and further including: means for classifying the third frame as the intra-BSS frame if the BSS color matches a second BSS color of a HE access point the HE station is associated with.

In Example 35, the subject matter of any one or more of Examples 31-34 optionally include where the third frame is a data frame and the first frame is an acknowledgment frame; or, the third frame is a multi-user request-to-send frame, and the first frame is a clear-to-send (CTS) frame.

In Example 36, the subject matter of any one or more of Examples 24-35 optionally include ax station.

In Example 37, the subject matter of any one or more of Examples 24-36 optionally include means for processing radio frequency signals coupled to the memory; and means for transmitting and receiving radio frequency signals coupled to the means for processing radio frequency signals.

Example 38 is a non-transitory computer-readable storage medium that stores instructions for execution by one or more processors, the instructions to configure the one or more processors to cause an apparatus of a high-efficiency (HE) access point to: decode a first frame including a transmission opportunity (TXOP) address; if the first frame is not classified as an intra basic service set (BSS) or inter BSS, and the TXOP address matches a stored TXOP address, classify the first frame as an inter-basic service set (BSS) frame, if a second frame associated with the stored TXOP address is classified as the inter-BSS frame, or classify the first frame as an intra-BSS frame, if the second frame associated with the stored TXOP address is classified as the intra-BSS frame.

In Example 39, the subject matter of Example 38 optionally includes where the instructions further configure the one or more processors to cause the apparatus of the HE station to: if the first frame is classified as the inter-BSS frame, determine whether spatial reuse can be used, and if spatial reuse can be used, encode a third frame and configure the HE AP to transmit the third frame.

In Example 40, the subject matter of any one or more of Examples 38-39 optionally include where the TXOP address is one from the following group: a receiver address, a transmitter address, and a BSS identification (ID) address.

Example 41 is a method performed by an apparatus of a high-efficiency (HE) access point, the method including: decoding a first frame including a transmission opportunity (TXOP) address; if the first frame is not classified as an intra basic service set (BSS) or inter BSS, and the TXOP address matches a stored TXOP address, classifying the first frame as an inter-basic service set (BSS) frame, if a second frame associated with the stored TXOP address is classified as the inter-BSS frame, or classifying the first frame as an intra-BSS frame, if the second frame associated with the stored TXOP address is classified as the intra-BSS frame.

In Example 42, the subject matter of Example 41 optionally includes where the method further comprises: if the first frame is classified as the inter-BSS frame, determine whether spatial reuse can be used, and if spatial reuse can be used, encode a third frame and configure the HE AP to transmit the third frame.

In Example 43, the subject matter of any one or more of Examples 41-42 optionally include where the TXOP address is one from the following group: a receiver address, a transmitter address, and a BSS identification (ID) address.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a high-efficiency (HE) station (STA), the apparatus comprising: memory; and, processing circuitry coupled to the memory, the processing circuitry configured to: decode a physical layer (PHY) protocol data unit (PPDU), the PPDU comprising a frame, the frame comprising a receiver address (RA) field and a duration field; if the frame is a control frame that does not include a transmitter address (TA) field and a value indicated by the RA field matches a saved transmission opportunity (TXOP) holder address, classify the frame as an intra-basic service set (BSS) (intra-BSS) frame; if the frame comprises the TA field and neither the value indicated by the RA field nor a value indicated by the TA field is equal to a value indicated by a stored value of a BSS identification (ID)(BSSID), classify the frame as an inter-BSS frame; if a value indicated by the duration field is greater than a value indicated by an intra-BSS NAV and the frame is classified as the intra-BSS frame, set the value of the intra-BSS NAV to indicate the value indicated by the duration field; and if the value indicated by the duration field is greater than a value indicated by a basic network allocation vector (NAV) and the frame is classified as the inter-BSS frame, set the value of the basic NAV to indicate the value indicated by the duration field.

2. The apparatus of claim 1, wherein the processing circuitry is further configured to:
encode another PPDU;
determine whether to transmit the another PPDU based on at least one of the following: the classification of the PPDU, the value indicated by the intra-BSS NAV, and the value indicated by the inter-BSS NAV; and
in response to a determination to transmit the another PPDU, configure the HE STA to transmit the another PPDU.

3. The apparatus of claim 1, wherein the control frame is an acknowledgement frame or a clear-to-send frame.

4. The apparatus of claim 1, wherein the processing circuitry is further configured to:
if the value indicated by the RA field matches the value indicated by the saved BSSID, classify the frame as an intra-BSS frame.

5. The apparatus of claim 1, wherein the processing circuitry is further configured to:
if the frame comprises a color field and a value indicated by the color field is equal to a value indicated by a stored value of a BSS color, classify the frame as an intra-BSS frame.

6. The apparatus of claim 5, wherein the color field is an eight bit field.

7. The apparatus of claim 1, wherein the processing circuitry is further configured to:
store a media access control (MAC) address of a HE access point (AP) with which the HE STA is associated with as the saved TXOP holder address.

8. The apparatus of claim 1, wherein the value indicated by the stored value of the BSSID is a media access control (MAC) address of a HE access point (AP) with which the HE STA is associated with.

9. The apparatus of claim 1, wherein the processing circuitry is further configured to:
if the frame is classified as the inter-BSS frame, determine whether spatial reuse can be used, and if spatial reuse can be used, encode another frame and configure the HE station to transmit the another frame.

10. The apparatus of claim 1, wherein the processing circuitry is further configured to:
if the frame is a contention-free (CF)-end frame and the frame is classified as the inter-BSS frame, reset the basic NAV; and
if the frame is the CF-end frame and the frame is classified as the intra-BSS frame, reset the intra-BSS NAV.

11. The apparatus of claim 1, wherein the processing circuitry is further configured to:
in response to the frame not being classified as the intra-BSS NAV or the basic NAV, classify the frame as the basic NAV.

12. The apparatus of claim 1, wherein the stored value of the BSSID comprises one or more BSSIDs, the one or more BSSIDs comprising first BSSs with which the HE STA is associated with and second BSSs that are associated with the first BSSs, and wherein the memory is configured to store the intra-BSS NAV and the basic NAV.

13. The apparatus of claim 1, further comprising a direct conversion mixer, the direct conversion mixer configured to directly downconvert RF signals to baseband signals,
wherein the processing circuitry is configured to decode the baseband signals, the baseband signals including the PPDU.

14. The apparatus of claim 1, further comprising a super-heterodyne mixer, the super-heterodyne mixer configured to downconvert RF signals to intermediate frequency signals prior to generation of baseband signals,
wherein the processing circuitry is configured to decode the baseband signals, the baseband signals including the PPDU.

15. The apparatus of claim 1, further comprising transceiver circuitry coupled to the processing circuitry, the transceiver circuitry coupled to two or more patch antennas for receiving signalling in accordance with a multiple-input multiple-output (MIMO) technique.

16. The apparatus of claim 1, further comprising transceiver circuitry coupled to the processing circuitry, the transceiver circuitry coupled to two or more microstrip antennas for receiving signalling in accordance with a multiple-input multiple-output (MIMO) technique.

17. A method performed by an apparatus of a high-efficiency (HE) station (STA), the apparatus configured to operate in a basic service set (BSS), the method comprising:
decoding a physical layer (PHY) protocol data unit (PPDU), the PPDU comprising a frame, the frame comprising a receiver address (RA) field and a duration field; if the frame is a control frame that does not include a transmitter address (TA) field and a value indicated by the RA field matches a saved transmission opportunity (TXOP) holder address, classifying the frame as an intra-basic service set (BSS) (intra-BSS) frame; if the frame comprises the TA field and neither the value indicated by the RA field nor a value indicated by the TA field is equal to a value indicated by a stored value of a BSS identification (ID)(BSSID), classifying the frame as an inter-BSS frame; if a value indicated by the duration field is greater than a value indicated by an intra-BSS network allocation vector (NAV) and the frame is classified as the intra-BSS frame, setting the value of the intra-BSS NAV to indicate the value indicated by the duration field; and if the value indicated by the duration field is greater than a value indicated by a basic NAV and the frame is classified as the inter-BSS frame, setting the value of the basic NAV to indicate the value indicated by the duration field.

18. The method of claim 17, the method further comprises:
encoding another PPDU;
determining whether to transmit the another PPDU based on at least one of the following: the classification of the PPDU, the value indicated by the intra-BSS NAV, and the value indicated by the inter-BSS NAV;
in response to a determination to transmit the another PPDU, configuring the HE STA to transmit the another PPDU.

19. A non-transitory computer-readable storage medium that stores instructions for execution by one or more processors of an apparatus of a high-efficiency (HE) station (STA), the apparatus configured to operate in a basic service set (BSS) and the instructions to configure the one or more processors to: decode a physical layer (PHY) protocol data unit (PPDU), the PPDU comprising a frame, the frame comprising a receiver address (RA) field and a duration field; if the frame is a control frame that does not include a transmitter address (TA) field and a value indicated by the RA field matches a saved transmission opportunity (TXOP) holder address, classify the frame as an intra-basic service set (BSS) (intra-BSS) frame; if the frame comprises the TA field and neither the value indicated by the RA field nor a value indicated by the TA field is equal to a value indicated by a stored value of a BSS identification (ID)(BSSID), classify the frame as an inter-BSS frame; if a value indicated by the duration field is greater than a value indicated by an intra-BSS network allocation vector (NAV) and the frame is classified as the intra-BSS frame, set the value of the intra-BSS NAV to indicate the value indicated by the duration field; and if the value indicated by the duration field is greater than a value indicated by a basic NAV and the frame is classified as the inter-BSS frame, set the value of the basic NAV to indicate the value indicated by the duration field.

20. The non-transitory computer-readable storage medium of claim 19, wherein the instructions further configure the one or more processors to:
determine whether to transmit the another PPDU based on at least one of the following: the classification of the PPDU, the value indicated by the intra-BSS NAV, and the value indicated by the inter-BSS NAV;
in response to a determination to transmit the another PPDU, configure the HE STA to transmit the another PPDU.

* * * * *